United States Patent
Liang et al.

(10) Patent No.: US 12,010,030 B2
(45) Date of Patent: *Jun. 11, 2024

(54) FlowSpec MESSAGE PROCESSING METHOD AND SYSTEM, AND APPARATUS

(71) Applicant: HUAWEI TECHNOLOGIES CO., LTD., Guangdong (CN)

(72) Inventors: Qiandeng Liang, Wuhan (CN); Shunwan Zhuang, Beijing (CN); Nan Wu, Beijing (CN); Jianjie You, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 8 days.

This patent is subject to a terminal disclaimer.

(21) Appl. No.: 17/683,778

(22) Filed: Mar. 1, 2022

(65) Prior Publication Data

US 2022/0263764 A1 Aug. 18, 2022

Related U.S. Application Data

(63) Continuation of application No. 17/023,790, filed on Sep. 17, 2020, now Pat. No. 11,290,386, which is a
(Continued)

(30) Foreign Application Priority Data

Jul. 7, 2016 (CN) .......................... 201610533501.5

(51) Int. Cl.
*H04L 47/2441* (2022.01)
*H04L 12/46* (2006.01)
(Continued)

(52) U.S. Cl.
CPC ...... *H04L 47/2441* (2013.01); *H04L 12/4641* (2013.01); *H04L 12/66* (2013.01);
(Continued)

(58) Field of Classification Search
CPC . H04L 47/2441; H04L 12/4641; H04L 12/66; H04L 45/04; H04L 45/64; H04L 47/33
See application file for complete search history.

(56) References Cited

U.S. PATENT DOCUMENTS

2011/0317701 A1* 12/2011 Yamato ................ H04L 45/036
370/392
2012/0294617 A1* 11/2012 Miyamura ............. H04L 41/12
398/79
(Continued)

FOREIGN PATENT DOCUMENTS

CN 104012052 A 8/2014
CN 104348724 A 2/2015
(Continued)

OTHER PUBLICATIONS

IEEE Std 802.1AB™—2005, IEEE Standard for Local and metropolitan area networks Station and Media Access Control Connectivity Discovery, May 6, 2005. 172 pages.
(Continued)

*Primary Examiner* — Abdullahi E Salad
(74) *Attorney, Agent, or Firm* — WOMBLE BOND DICKINSON (US) LLP

(57) ABSTRACT

The present disclosure discloses a flow specification (FlowSpec) message processing method. In the method, a controller forwards device interface information reported by the forwarding device; selects at least one forwarding device interface to which a FlowSpec rule needs to be applied from the received forwarding device interface information; generates an application interface rule based on the at least one forwarding device interface to which the FlowSpec rule needs to be applied; and sends a FlowSpec message to the forwarding device.

22 Claims, 9 Drawing Sheets

Related U.S. Application Data continuation of application No. 16/240,242, filed on Jan. 4, 2019, now Pat. No. 10,791,059, which is a continuation of application No. PCT/CN2017/084379, filed on May 15, 2017.

(51) Int. Cl.
*H04L 12/66* (2006.01)
*H04L 45/02* (2022.01)
*H04L 45/64* (2022.01)
*H04L 47/33* (2022.01)

(52) U.S. Cl.
CPC .............. *H04L 45/04* (2013.01); *H04L 45/64* (2013.01); *H04L 47/33* (2013.01)

(56) References Cited

U.S. PATENT DOCUMENTS

| | | | |
|---|---|---|---|
| 2015/0055508 A1* | 2/2015 | Ashida | H04L 41/34 370/254 |
| 2016/0182300 A1* | 6/2016 | Mopuri | H04L 41/0896 370/235 |
| 2017/0134281 A1* | 5/2017 | Tavarekere Ananthapadmanabha | H04L 47/2483 |

FOREIGN PATENT DOCUMENTS

| | | |
|---|---|---|
| CN | 105072085 A | 11/2015 |
| WO | 2015014187 A1 | 2/2015 |

OTHER PUBLICATIONS

H. Gredler et al, North-Bound Distribution of Link-State and TE Information using BGP draft-ietf-idr-ls-distribution-11, Jun. 4, 2015, 45 pages.

Q. Liang et al. BGP FlowSpec with Time Constraints, draft-liang-idr-bgp-flowspec-time-00, Oct. 18, 2015. 9 pages.

S. Litkowski et al. Applying BGP flowspec rules on a specific interface set, draft-litkowski-idr-flowspec-interfaceset-03. Dec. 8, 2015. 13 pages.

K. Lougheed et al: "A Border Gateway Protocol (BGP)", Network Working Group, rfc1105, Jun. 1989, 17 pages.

K. Lougheed et al: "A Border Gateway Protocol (BGP)", Network Working Group, rfc1163, Jun. 1990, 29 pages.

K. Lougheed et al "A Border Gateway Protocol 3 (BGP-3)", Network Working Group, rfc1267, Oct. 1991, 35 pages.

Y. Rekhter, Ed et al: "A Border Gateway Protocol 4 (BGP-4)", Network Working Group, Category: Standards Track, rfc4271, Jan. 2006, 104 pages.

E. Rosen et al, BGP/MPLS IP Virtual Private Networks (VPNs). RFC 4364, Feb. 2006, 47 pages.

Bates, T., et al., "BGP Route Reflection: An Alternative to Full Mesh Internal BGP(IBGP)," RFC 4456, Apr. 2006, 12 pages.

T. Bates et al: "Multiprotocol Extensions for BGP-4", Network Working Group, Category: Standards Track, rfc4760, Jan. 2007, 12 pages.

J. Scudder et al, Capabilities Advertisement with BGP-4. RFC5492, Feb. 2009, 7 pages.

D. Walton et al: "Advertisement of Multiple Paths in BGP", Network Working Group, Category: Standards Track, draft-ietf-idr-add-paths-10, Oct. 2014, 8 pages.

S. Litkowski et al, Applying BGP flowspec rules on a specific interface set; draft-ietf-idr-flowspec-interfaceset-00.txt, May 18, 2016, XP015113124, 14 pages.

Q. Liang et al,"OSPF Extensions for Flow Specification draft-ietf-ospf-flowspec-extensions-01", ospf Working Group Internet-Draft, Apr. 14, 2016, total 20 pages.

\* cited by examiner

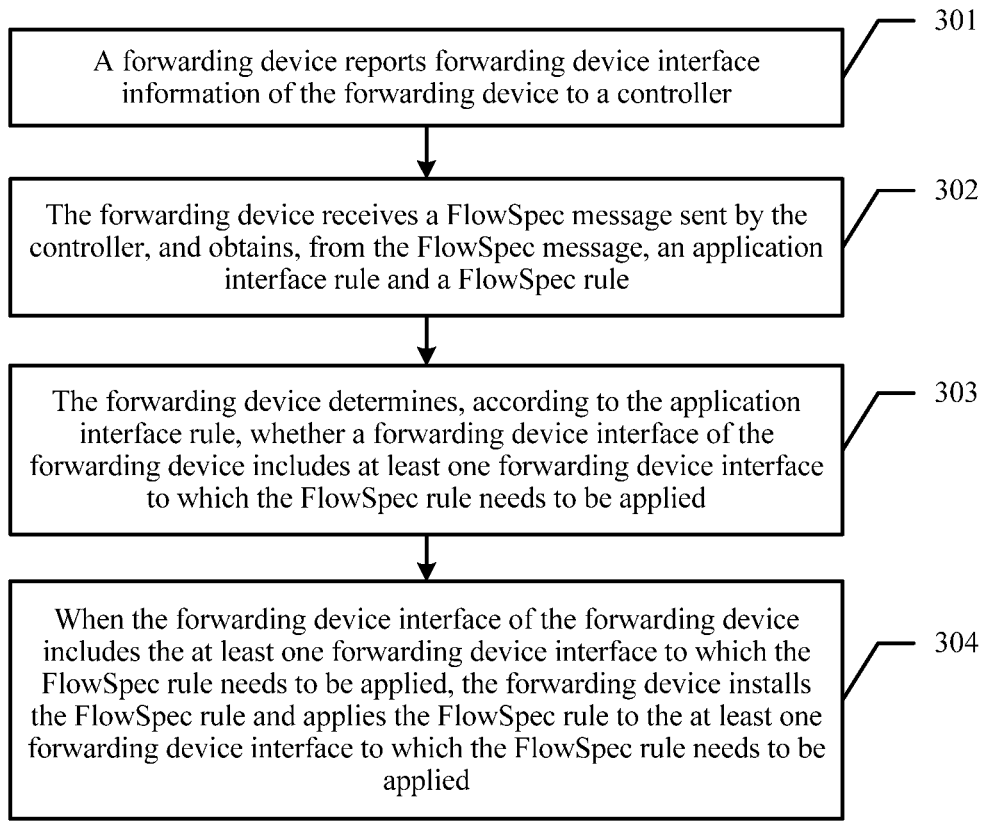
FIG. 3
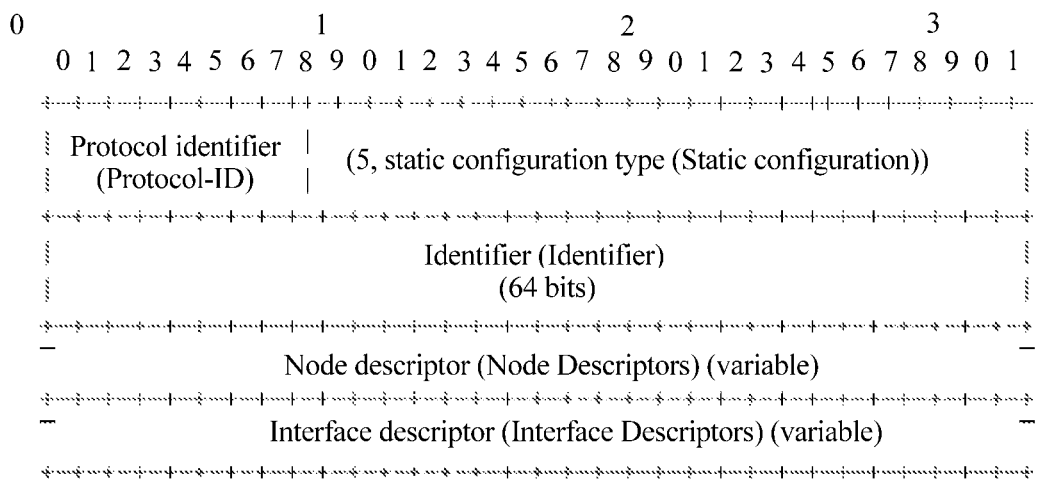
FIG. 4-a

| Sub-TLV code point (Code Point) | Description (Description) | Length (Length) |
|---|---|---|
| TBD1 (mandatory) | BGP descriptor (Identifier) | 4 |

FIG. 4-b

| Sub-TLV code point (Code Point) | Description (Description) | Length (Length) | Value (Value) |
|---|---|---|---|
| TBD2 (mandatory) | Interface identifier (Interface Identifier) | Variable | Interface identifier value |
| TBD3 (optional) | Interface description (Interface Description) | Variable | Interface description value |
| TBD4–7 (optional) | Interface service (Interface Service) | Variable | Values described in FIG. 4-e |
| TBD14 (optional) | Interface group (Interface Group) | Variable | UUID or integral number |

FIG. 4-c

| Sub-TLV code point (Code Point) | Description (Description) | Length (Length) | Value (Value) |
|---|---|---|---|
| TBD4 (optional) | L2VPN (VPLS) | Variable | Values described in FIG. 4-e |
| TBD5 (optional) | L2VPN (VPWS) | Variable | Values described in FIG. 4-e |
| TBD6 (optional) | EVPN | Variable | Values described in FIG. 4-e |
| TBD7 (optional) | L3VPN | Variable | Values described in FIG. 4-e |

FIG. 4-d

| Sub-TLV code point (Code Point) | Description (Description) | Length (Length) | Value (Value) |
|---|---|---|---|
| TBD8 (mandatory) | VPN name | Variable | VPN instance name |
| TBD9 (variable) | RD | 8 | RD value |
| TBD10 (variable) | Import RT | 8 | RT value |
| TBD11 (variable) | Export RT | 8 | RT value |
| TBD12 (variable) | ESI | Variable | ESI value |
FIG. 4-e
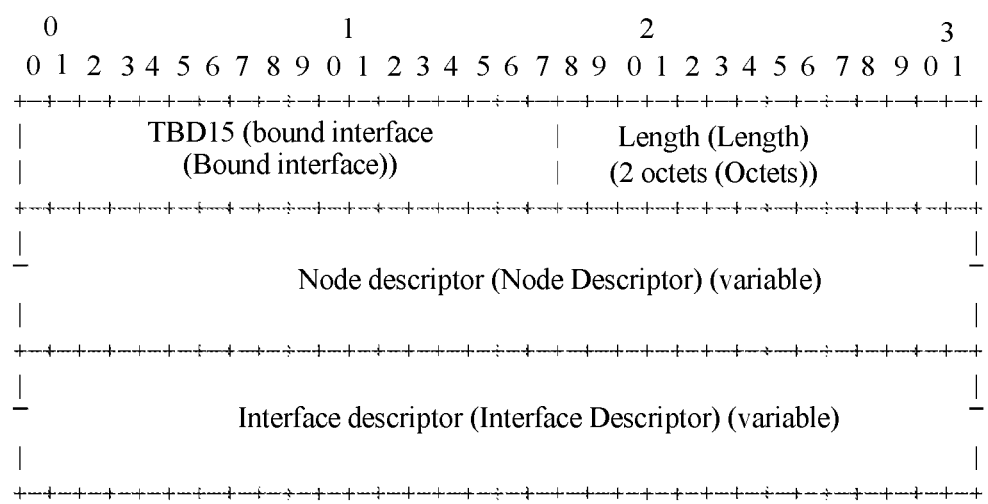
FIG. 4-f

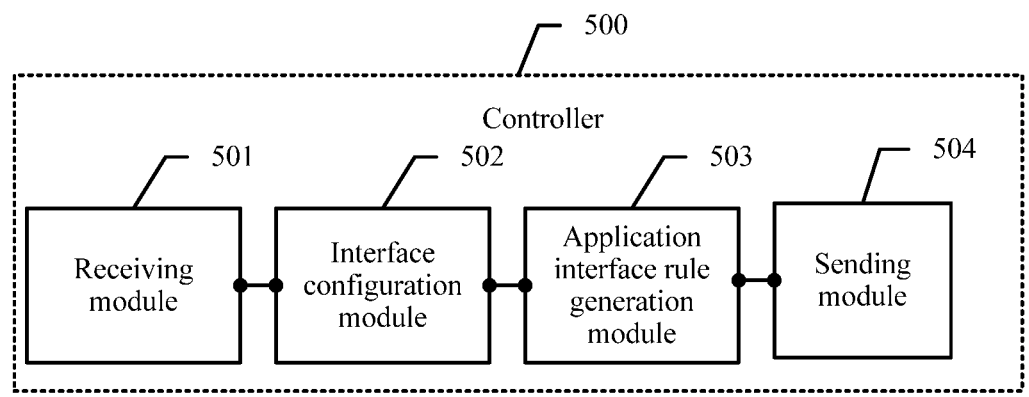
FIG. 5-a
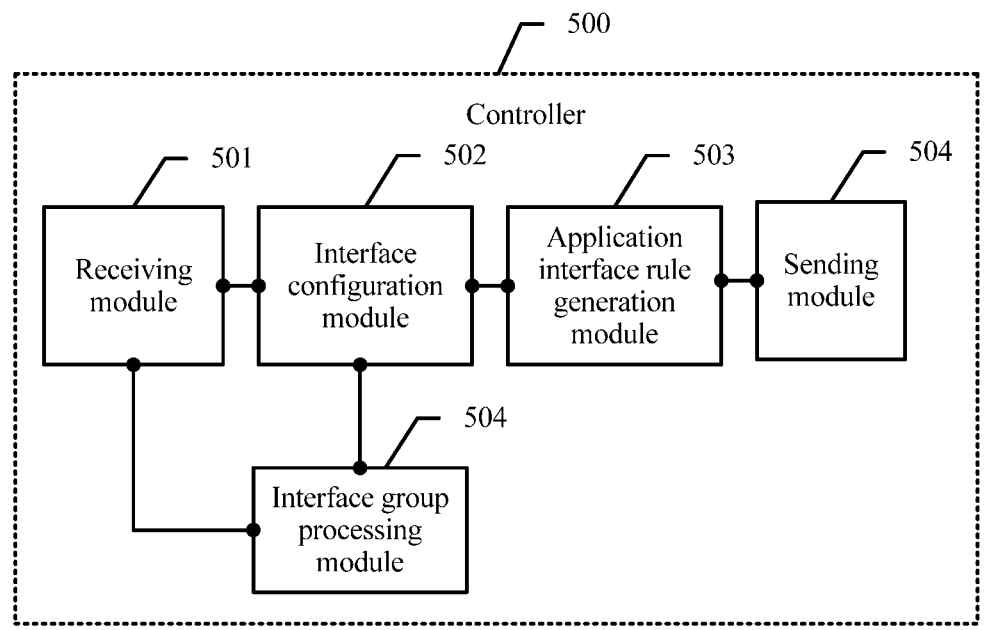
FIG. 5-b

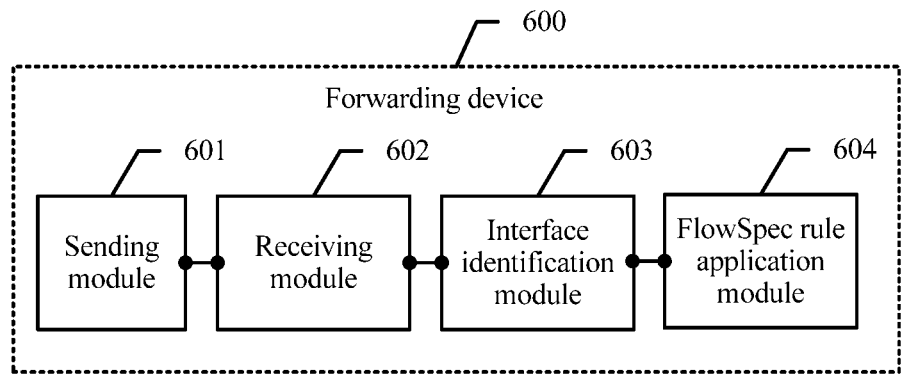
FIG. 6-a
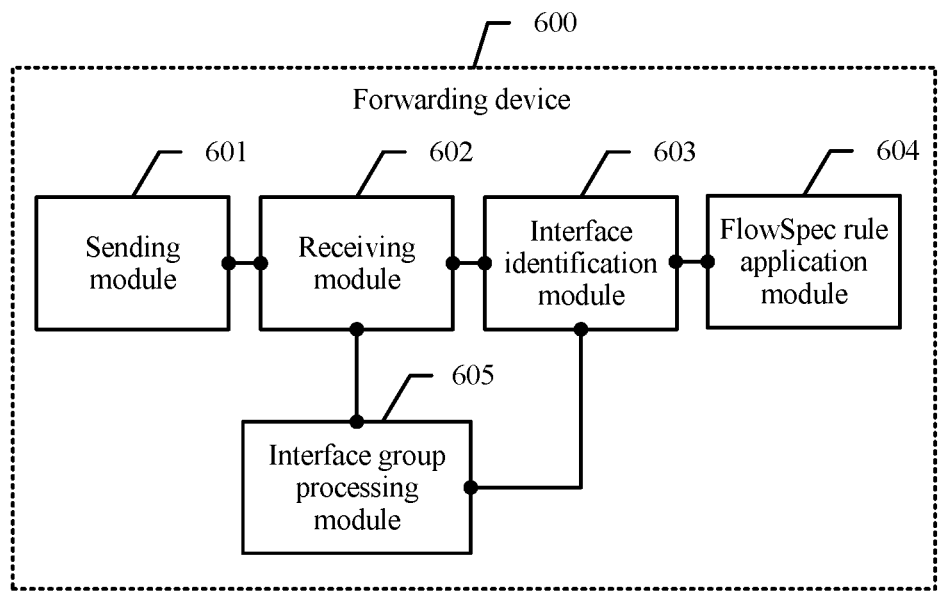
FIG. 6-b

FlowSpec MESSAGE PROCESSING METHOD AND SYSTEM, AND APPARATUS

CROSS-REFERENCE TO RELATED APPLICATIONS

This application is a continuation of U.S. patent application Ser. No. 17/023,790, filed on Sep. 17, 2020, which is a continuation of U.S. patent application Ser. No. 16/240,242, filed on Jan. 4, 2019, now U.S. Pat. No. 10,791,059. The U.S. patent application Ser. No. 16/240,242 is a continuation of International Application No. PCT/CN2017/084379, filed on May 15, 2017, which claims priority to Chinese Patent Application No. 201610533501.5, filed on Jul. 7, 2016. All of the aforementioned patent applications are hereby incorporated by reference in their entireties.

TECHNICAL FIELD

The present disclosure relates to the field of communications technologies, and in particular, to a flow specification (FlowSpec) message processing method and system, and an apparatus.

BACKGROUND

The Border Gateway Protocol (BGP) is a dynamic routing protocol used between autonomous systems (AS). The Border Gateway Protocol (BGP) is widely applied to the Internet to transfer routing information between ASs and edge routers within an AS. The transferred routing information includes network layer reachability information (NLRI), such as Internet Protocol (IP) routing information, Media Access Control (MAC) routing information, a FlowSpec rule. The BGP FlowSpec rule is one of centralized traffic scheduling technologies based on a software-defined networking (SDN) architecture. A centralized SDN controller delivers a FlowSpec rule to a forwarding device by using a BGP FlowSpec message, to optimize and schedule a service flow according to a user's requirement.

However, in the prior art, a controller delivers a flow rule by using a FlowSpec message, and the flow rule is preferably installed on a forwarding device and takes effect globally. In other words, traffic accessing all device interfaces of the forwarding device attempts to match the flow rule. Consequently, a control granularity for the flow rule is not fine-grained enough.

SUMMARY

Embodiments of the present disclosure provide a FlowSpec message processing method and system, and an apparatus, to implement fine-grained control over a service flow of a forwarding device based on a forwarding device interface.

To resolve the foregoing technical problem, the embodiments of the present disclosure provide the following technical solutions:

According to a first aspect, an embodiment of the present disclosure provides a FlowSpec message processing method, including:
receiving, by a controller, forwarding device interface information reported by a forwarding device;
selecting, by the controller from the received forwarding device interface information, at least one forwarding device interface to which a FlowSpec rule needs to be applied;
generating, by the controller, an application interface rule based on the at least one forwarding device interface to which the FlowSpec rule needs to be applied, where the application interface rule is used to instruct the forwarding device to determine a forwarding device interface to which the FlowSpec rule can be applied; and
sending, by the controller, a FlowSpec message to the forwarding device, where the FlowSpec message includes the application interface rule and the FlowSpec rule.

In this embodiment of the present disclosure, the forwarding device reports the forwarding device interface information of the forwarding device to the controller. Therefore, when delivering the FlowSpec rule, the controller may configure, based on the received forwarding device interface information, a forwarding device interface to which the FlowSpec rule is applied, so that the controller may configure specific forwarding device interface(s) to which the FlowSpec rule needs to be applied, and generate a corresponding application interface rule. In this embodiment of the present disclosure, the controller may control one FlowSpec rule to be applied to a flexibly specified forwarding device interface on the forwarding device, so that an application range of the flow rule is specified automatically and flexibly according to a user's requirement, and fine-grained control over a service is implemented.

With reference to the first aspect, in a first possible implementation of the first aspect, the forwarding device interface information includes an interface identifier of the forwarding device interface; and
the generating, by the controller, an application interface rule based on the at least one forwarding device interface to which the FlowSpec rule needs to be applied includes:
obtaining, by the controller, at least one interface identifier corresponding to the at least one forwarding device interface to which the FlowSpec rule needs to be applied; and
generating, by the controller, the application interface rule, where the application interface rule includes an interface identifier set, and the interface identifier set includes the at least one interface identifier corresponding to the at least one forwarding device interface to which the FlowSpec rule needs to be applied.

In this embodiment of the present disclosure, the application interface rule generated by the controller may include the interface identifier set, and the interface identifier set is used to instruct the forwarding device to determine the forwarding device interface to which the FlowSpec rule can be applied.

With reference to the first aspect, in a second possible implementation of the first aspect, the generating, by the controller, an application interface rule based on the at least one forwarding device interface to which the FlowSpec rule needs to be applied includes:
determining, by the controller, an interface group to which the at least one forwarding device interface to which the FlowSpec rule needs to be applied belongs;
obtaining, by the controller, an interface group identifier corresponding to the interface group to which the at least one forwarding device interface to which the FlowSpec rule needs to be applied belongs; and
generating, by the controller, the application interface rule, where the application interface rule includes the interface group identifier.

In this embodiment of the present disclosure, the application interface rule generated by the controller may include the interface group identifier, and the interface group identifier is used to instruct the forwarding device to determine the forwarding device interface to which the FlowSpec rule can be applied.

With reference to the second possible implementation of the first aspect, in a third possible implementation of the first aspect, before the determining, by the controller, an interface group to which an interface identifier corresponding to the at least one forwarding device interface to which the FlowSpec rule needs to be applied belongs, the method further includes:
   creating, by the controller, the interface group identifier and an interface identifier of a forwarding device interface included in the interface group; and
   sending, by the controller, the interface group identifier and the interface identifier of the forwarding device interface included in the interface group that are created to the forwarding device.

With reference to the first aspect, in a fourth possible implementation of the first aspect, the generating, by the controller, an application interface rule based on the at least one forwarding device interface to which the FlowSpec rule needs to be applied includes:
   generating, by the controller, the application interface rule, where the application interface rule includes a service filter criterion, and the service filter criterion is used to obtain through filtering, from the forwarding device interface information, the at least one forwarding device interface to which the FlowSpec rule needs to be applied.

In this embodiment of the present disclosure, the application interface rule generated by the controller may include the service filter criterion, and the service filter criterion is used to instruct the forwarding device to determine the forwarding device interface to which the FlowSpec rule can be applied.

With reference to the first aspect, the first possible implementation, the second possible implementation, the third possible implementation, or the fourth possible implementation of the first aspect, in a fifth possible implementation of the first aspect, the sending, by the controller, a FlowSpec message to the forwarding device includes:
   sending, by the controller, the FlowSpec message to the forwarding device by using BGP route attribute information, where the BGP route attribute information carries the application interface rule.

In this embodiment of the present disclosure, the controller may add the application interface rule to the BGP route attribute information, to complete sending of the FlowSpec message by extending the BGP route attribute information.

With reference to the first aspect, the first possible implementation, the second possible implementation, the third possible implementation, or the fourth possible implementation of the first aspect, in a sixth possible implementation of the first aspect, the receiving, by a controller, forwarding device interface information reported by a forwarding device includes:
   receiving, by the controller by using the Border Gateway Protocol-Link State (BGP-LS) protocol, the forwarding device interface information reported by the forwarding device.

In this embodiment of the present disclosure, the controller and the forwarding device may communicate with each other by using the BGP-LS protocol, to complete transmission of the forwarding device interface information in a BGP-LS scenario.

With reference to the fifth possible implementation of the first aspect, in a seventh possible implementation of the first aspect, the BGP route attribute information includes at least one of the following information: flow extended attribute flow extended attribute information, extended communities attribute ECA information of an interface group interface group, and service filter attribute information.

According to a second aspect, an embodiment of the present disclosure further provides an information processing method, including:
   reporting, by a forwarding device, forwarding device interface information of the forwarding device to a controller;
   receiving, by the forwarding device, a FlowSpec message sent by the controller, and obtaining, from the FlowSpec message, an application interface rule and a FlowSpec rule;
   determining, by the forwarding device according to the application interface rule, whether a forwarding device interface of the forwarding device includes at least one forwarding device interface to which the FlowSpec rule needs to be applied; and
   when the forwarding device interface of the forwarding device includes the at least one forwarding device interface to which the FlowSpec rule needs to be applied, applying, by the forwarding device, the FlowSpec rule to the at least one forwarding device interface to which the FlowSpec rule needs to be applied.

In this embodiment of the present disclosure, the forwarding device reports the forwarding device interface information of the forwarding device to the controller. Therefore, when delivering the FlowSpec rule, the controller may configure, based on the received forwarding device interface information, a forwarding device interface to which the FlowSpec rule needs to be applied, so that the controller may configure specific forwarding device interface(s) to which the FlowSpec rule needs to be applied, and generate a corresponding application interface rule. In this embodiment of the present disclosure, the controller may control one FlowSpec rule to be applied to a flexibly specified forwarding device interface on the forwarding device, so that an application range of the flow rule is specified automatically and flexibly according to a user's requirement, and fine-grained control over a service is implemented.

With reference to the second aspect, in a first possible implementation of the second aspect, when the application interface rule is an interface identifier set, the determining, by the forwarding device according to the application interface rule, whether a forwarding device interface of the forwarding device includes at least one forwarding device interface to which the FlowSpec rule needs to be applied includes:
   obtaining, by the forwarding device, an interface identifier from the interface identifier set; and
   searching, by the forwarding device, an interface identifier corresponding to the forwarding device interface of the forwarding device for the interface identifier in the interface identifier set.

In this embodiment of the present disclosure, the application interface rule generated by the controller may include the interface identifier set, and the interface identifier set is used to instruct the forwarding device to determine the forwarding device interface to which the FlowSpec rule can be applied.

With reference to the second aspect, in a second possible implementation of the second aspect, when the application interface rule is an interface group identifier, the determining, by the forwarding device according to the application interface rule, whether a forwarding device interface of the forwarding device includes at least one forwarding device interface to which the FlowSpec rule needs to be applied includes:

obtaining, by the forwarding device, an interface group based on the interface group identifier; and searching, by the forwarding device, the forwarding device interface of the forwarding device for a forwarding device interface included in the interface group.

In this embodiment of the present disclosure, the application interface rule generated by the controller may include the interface group identifier, and the interface group identifier is used to instruct the forwarding device to determine the forwarding device interface to which the FlowSpec rule can be applied.

With reference to the second possible implementation of the second aspect, in a third possible implementation of the second aspect, before the determining, by the forwarding device according to the application interface rule, whether a forwarding device interface of the forwarding device includes at least one forwarding device interface to which the FlowSpec rule needs to be applied, the method further includes:

receiving, by the forwarding device, an interface group identifier and an interface identifier of the forwarding device interface included in the interface group that are delivered by the controller; and filtering, by the forwarding device, the forwarding device interface of the forwarding device based on the interface group identifier and the interface identifier of the forwarding device interface included in the interface group that are delivered by the controller, and maintaining an association relationship between the forwarding device interface of the forwarding device and the interface group.

With reference to the second aspect, in a fourth possible implementation of the second aspect, when the application interface rule is a service filter criterion, the determining, by the forwarding device according to the application interface rule, whether a forwarding device interface of the forwarding device includes at least one forwarding device interface to which the FlowSpec rule needs to be applied includes:

searching, by the forwarding device, the forwarding device interface of the forwarding device for a forwarding device interface meeting the service filter criterion; and if the forwarding device interface of the forwarding device includes the forwarding device interface meeting the service filter criterion, determining that the forwarding device includes the at least one forwarding device interface to which the FlowSpec rule needs to be applied, or if the forwarding device interface of the forwarding device does not include a forwarding device interface meeting the service filter criterion, determining that the forwarding device interface of the forwarding device does not include the at least one forwarding device interface to which the FlowSpec rule needs to be applied.

In this embodiment of the present disclosure, the application interface rule generated by the controller may include the service filter criterion, and the service filter criterion is used to instruct the forwarding device to determine the forwarding device interface to which the FlowSpec rule can be applied.

With reference to the second aspect, the first possible implementation, the second possible implementation, the third possible implementation, or the fourth possible implementation of the second aspect, in a fifth possible implementation of the second aspect, the forwarding device interface information includes at least one of the following information: interface identifier interface identifier information, interface description interface description information, interface service interface service information, and interface group interface group information.

With reference to the second aspect, the first possible implementation, the second possible implementation, the third possible implementation, or the fourth possible implementation of the second aspect, in a sixth possible implementation of the second aspect, the reporting, by a forwarding device, forwarding device interface information of the forwarding device to a controller includes:

reporting, by the forwarding device, the forwarding device interface information of the forwarding device to the controller by using the Border Gateway Protocol-Link State BGP-LS.

In this embodiment of the present disclosure, the controller and the forwarding device may communicate with each other by using the BGP-LS protocol, to complete transmission of the forwarding device interface information in a BGP-LS scenario.

With reference to the fifth possible implementation of the second aspect, in a seventh possible implementation of the second aspect, the forwarding device interface information includes interface information of the forwarding device and/or device information of the forwarding device.

The device information of the forwarding device includes a BGP identifier.

The interface service information is one of the following types of information: virtual private LAN service (VPLS) information, virtual private wire service (VPWS) information, Ethernet virtual private network (EVPN) information, and layer 3 virtual private network (L3VPN) information.

The interface service information includes at least one of the following information: VPN instance name information, VPN instance ID information, route distinguisher (RD) information, an import route target (RT), an export RT, and an Ethernet segment identifier (ESI).

According to a third aspect, an embodiment of the present disclosure further provides a controller, including:

a receiving module, configured to receive forwarding device interface information reported by a forwarding device;

an interface configuration module, configured to select, from the received forwarding device interface information, at least one forwarding device interface to which a FlowSpec rule needs to be applied;

an application interface rule generation module, configured to generate an application interface rule based on the at least one forwarding device interface to which the FlowSpec rule needs to be applied, where the application interface rule is used to instruct the forwarding device to determine a forwarding device interface to which the FlowSpec rule can be applied; and a sending module, configured to send a FlowSpec message to the forwarding device, where the FlowSpec message includes the application interface rule and the FlowSpec rule.

In this embodiment of the present disclosure, the forwarding device reports the forwarding device interface information of the forwarding device to the controller. Therefore, when delivering the FlowSpec rule, the controller may configure, based on the received forwarding device interface information, a forwarding device interface to which the FlowSpec rule needs to be applied, so that the controller may configure specific forwarding device interface(s) to which the FlowSpec rule needs to be applied, and generate a corresponding application interface rule. In this embodiment of the present disclosure, the controller may control one FlowSpec rule to be applied to a flexibly specified forwarding device interface on the forwarding device, so that an application range of the flow rule is specified automatically and flexibly according to a user's requirement, and fine-grained control over a service is implemented.

With reference to the third aspect, in a first possible implementation of the third aspect, the forwarding device interface information includes an interface identifier of the forwarding device interface; and the application interface rule generation module is configured to: obtain at least one interface identifier corresponding to the at least one forwarding device interface to which the FlowSpec rule needs to be applied; and generate the application interface rule, where the application interface rule includes an interface identifier set, and the interface identifier set includes the at least one interface identifier corresponding to the at least one forwarding device interface to which the FlowSpec rule needs to be applied.

In this embodiment of the present disclosure, the application interface rule generated by the controller may include the interface identifier set, and the interface identifier set is used to instruct the forwarding device to determine the forwarding device interface to which the FlowSpec rule can be applied.

With reference to the third aspect, in a second possible implementation of the third aspect, the application interface rule generation module is configured to: determine an interface group to which the at least one forwarding device interface to which the FlowSpec rule needs to be applied belongs; obtain an interface group identifier corresponding to the interface group to which the at least one forwarding device interface to which the FlowSpec rule needs to be applied belongs; and generate the application interface rule, where the application interface rule includes the interface group identifier.

In this embodiment of the present disclosure, the application interface rule generated by the controller may include the interface group identifier, and the interface group identifier is used to instruct the forwarding device to determine the forwarding device interface to which the FlowSpec rule can be applied.

With reference to the second possible implementation of the third aspect, in a third possible implementation of the third aspect, the controller further includes an interface group processing module, configured to: create the interface group identifier and an interface identifier of a forwarding device interface included in the interface group; and send the interface group identifier and the interface identifier of the forwarding device interface included in the interface group that are created to the forwarding device.

With reference to the third aspect, in a fourth possible implementation of the third aspect, the application interface rule generation module is configured to generate the application interface rule, where the application interface rule includes a service filter criterion, and the service filter criterion is used to select through filtering, from the forwarding device interface information, the at least one forwarding device interface to which the FlowSpec rule needs to be applied.

In this embodiment of the present disclosure, the application interface rule generated by the controller may include the service filter criterion, and the service filter criterion is used to instruct the forwarding device to determine the forwarding device interface to which the FlowSpec rule can be applied.

With reference to the third aspect, the first possible implementation, the second possible implementation, the third possible implementation, or the fourth possible implementation of the third aspect, in a fifth possible implementation of the third aspect, the sending module is configured to send the FlowSpec message to the forwarding device by using BGP route attribute information, where the BGP route attribute information carries the application interface rule.

In this embodiment of the present disclosure, the controller may add the application interface rule to the BGP route attribute information, to complete sending of the FlowSpec message by extending the BGP route attribute information.

With reference to the third aspect, the first possible implementation, the second possible implementation, the third possible implementation, or the fourth possible implementation of the third aspect, in a sixth possible implementation of the third aspect, the receiving module is configured to receive, by using the Border Gateway Protocol-Link State (BGP-LS) protocol, the forwarding device interface information reported by the forwarding device.

In this embodiment of the present disclosure, the controller and the forwarding device may communicate with each other by using the BGP-LS protocol, to complete transmission of the forwarding device interface information in a BGP-LS scenario.

According to a fourth aspect, an embodiment of the present disclosure further provides a forwarding device, including:

a sending module, configured to report forwarding device interface information of the forwarding device to a controller;

a receiving module, configured to receive a FlowSpec message sent by the controller, and obtain, from the FlowSpec message, an application interface rule and a FlowSpec rule;

an interface identification module, configured to determine, according to the application interface rule, whether a forwarding device interface of the forwarding device includes at least one forwarding device interface to which the FlowSpec rule needs to be applied; and a FlowSpec rule application module, configured to: when the forwarding device interface of the forwarding device includes the at least one forwarding device interface to which the FlowSpec rule needs to be applied, apply the FlowSpec rule to the at least one forwarding device interface to which the FlowSpec rule needs to be applied.

In this embodiment of the present disclosure, the forwarding device reports the forwarding device interface information of the forwarding device to the controller. Therefore, when delivering the FlowSpec rule, the controller may configure, based on the received forwarding device interface information, a forwarding device interface to which the FlowSpec rule needs to be applied, so that the controller may configure specific forwarding device interface(s) to which the FlowSpec rule needs to be applied, and generate a corresponding application interface rule. In this embodiment of the present disclosure, the controller may control one FlowSpec rule to be applied to a flexibly specified forwarding device interface on the forwarding device, so that an application range of the flow rule is specified automatically and flexibly according to a user's requirement, and fine-grained control over a service is implemented.

With reference to the fourth aspect, in a first possible implementation of the fourth aspect, when the application interface rule is an interface identifier set, the interface identification module is configured to: obtain an interface identifier from the interface identifier set; and search an interface identifier corresponding to the forwarding device interface of the forwarding device for the interface identifier in the interface identifier set.

In this embodiment of the present disclosure, the application interface rule generated by the controller may include the interface identifier set, and the interface identifier set is used to instruct the forwarding device to determine the forwarding device interface to which the FlowSpec rule can be applied.

With reference to the fourth aspect, in a second possible implementation of the fourth aspect, when the application interface rule is an interface group identifier, the interface identification module is configured to: obtain an interface group based on the interface group identifier; and search the forwarding device interface of the forwarding device for a forwarding device interface included in the interface group.

In this embodiment of the present disclosure, the application interface rule generated by the controller may include the interface group identifier, and the interface group identifier is used to instruct the forwarding device to determine the forwarding device interface to which the FlowSpec rule can be applied.

With reference to the second possible implementation of the fourth aspect, in a third possible implementation of the fourth aspect, the forwarding device further includes an interface group processing module, configured to: before the interface identification module determines, according to the application interface rule, whether the forwarding device interface of the forwarding device includes the at least one forwarding device interface to which the FlowSpec rule needs to be applied, receive an interface group identifier and an interface identifier of the forwarding device interface included in the interface group that are delivered by the controller; and filter the forwarding device interface of the forwarding device based on the interface group identifier and the interface identifier of the forwarding device interface included in the interface group that are delivered by the controller, and maintain an association relationship between the forwarding device interface of the forwarding device and the interface group.

With reference to the fourth aspect, in a fourth possible implementation of the fourth aspect, when the application interface rule is a service filter criterion, the interface identification module is configured to: search the forwarding device interface of the forwarding device for a forwarding device interface meeting the service filter criterion; and if the forwarding device interface of the forwarding device includes the forwarding device interface meeting the service filter criterion, determine that the forwarding device includes the at least one forwarding device interface to which the FlowSpec rule needs to be applied, or if the forwarding device interface of the forwarding device does not include a forwarding device interface meeting the service filter criterion, determine that the forwarding device interface of the forwarding device does not include the at least one forwarding device interface to which the FlowSpec rule needs to be applied.

In this embodiment of the present disclosure, the application interface rule generated by the controller may include the service filter criterion, and the service filter criterion is used to instruct the forwarding device to determine the forwarding device interface to which the FlowSpec rule can be applied.

With reference to the fourth aspect, the first possible implementation, the second possible implementation, the third possible implementation, or the fourth possible implementation of the fourth aspect, in a fifth possible implementation of the fourth aspect, the forwarding device interface information includes at least one of the following information: interface identifier interface identifier information, interface description interface description information, interface service interface service information, and interface group interface group information.

With reference to the fourth aspect, the first possible implementation, the second possible implementation, the third possible implementation, or the fourth possible implementation of the fourth aspect, in a sixth possible implementation of the fourth aspect, the sending module is configured to report the forwarding device interface information of the forwarding device to the controller by using the Border Gateway Protocol-Link State (BGP-LS).

In this embodiment of the present disclosure, the controller and the forwarding device may communicate with each other by using the BGP-LS protocol, to complete transmission of the forwarding device interface information in a BGP-LS scenario.

According to a fifth aspect, an embodiment of the present disclosure further provides a FlowSpec message processing system, including the controller according to any implementation of the third aspect and the forwarding device according to any implementation of the fourth aspect.

In the embodiments of the present disclosure, the forwarding device reports the forwarding device interface information of the forwarding device to the controller. Therefore, when delivering the FlowSpec rule, the controller may configure, based on the received forwarding device interface information, a forwarding device interface to which the FlowSpec rule needs to be applied, so that the controller may configure specific forwarding device interface(s) to which the FlowSpec rule needs to be applied, and generate a corresponding application interface rule. In the embodiments of the present disclosure, the controller may control one FlowSpec rule to be applied to a flexibly specified forwarding device interface on the forwarding device, so that an application range of the flow rule is specified automatically and flexibly according to a user's requirement, and fine-grained control over a service is implemented.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and persons skilled in the art may derive other drawings from these accompanying drawings.

FIG. 3 is a schematic block flowchart of another FlowSpec message processing method according to an embodiment of the present disclosure;

FIG. 4-*a* is a schematic data structure diagram of interface NLRI according to an embodiment of the present disclosure;

FIG. 4-*b* is a schematic data structure diagram of extended node descriptor sub-TLVs (type, length, value) according to an embodiment of the present disclosure;

FIG. 4-*c* is another schematic data structure diagram of extended interface descriptor sub-TLVs according to an embodiment of the present disclosure;

FIG. 4-*d* is a schematic data structure diagram of interface service sub-TLVs according to an embodiment of the present disclosure;

FIG. 4-*e* is another schematic data structure diagram of extended service sub-TLVs according to an embodiment of the present disclosure;

FIG. 4-*f* is a schematic data structure diagram of bound interface sub-TLVs according to an embodiment of the present disclosure;

FIG. 5-*a* is a schematic structural composition diagram of a controller according to an embodiment of the present disclosure;

FIG. 5-*b* is a schematic structural composition diagram of another controller according to an embodiment of the present disclosure;

FIG. 6-*a* is a schematic structural composition diagram of a forwarding device according to an embodiment of the present disclosure;

FIG. 6-*b* is a schematic structural composition diagram of another forwarding device according to an embodiment of the present disclosure;

DESCRIPTION OF EMBODIMENTS

Embodiments of the present disclosure provide a FlowSpec message processing method and system, and an apparatus, to implement fine-grained control over a service flow of a forwarding device based on a forwarding device interface.

To make the disclosure objectives, features, and advantages of the present disclosure clearer and more comprehensible, the following describes the technical solutions in the embodiments of the present disclosure with reference to the accompanying drawings in the embodiments of the present disclosure. Apparently, the embodiments described in the following are merely some rather than all of the embodiments of the present disclosure. All other embodiments obtained by persons skilled in the art based on the embodiments of the present disclosure shall fall within the protection scope of the present disclosure.

In the specification, claims, and accompanying drawings of the present disclosure, the terms "first", "second", and so on are intended to distinguish between similar objects but do not necessarily indicate a specific order or sequence. It should be understood that the terms used in such a way are interchangeable in proper circumstances, which is merely a discrimination manner that is used when objects having a same attribute are described in the embodiments of the present disclosure. In addition, the terms "include", "contain", and any other variants mean to cover a non-exclusive inclusion, so that a process, method, system, product, or device that includes a series of units is not necessarily limited to those units, but may include other units not expressly listed or inherent to such a process, method, system, product, or device.

Figure 1:
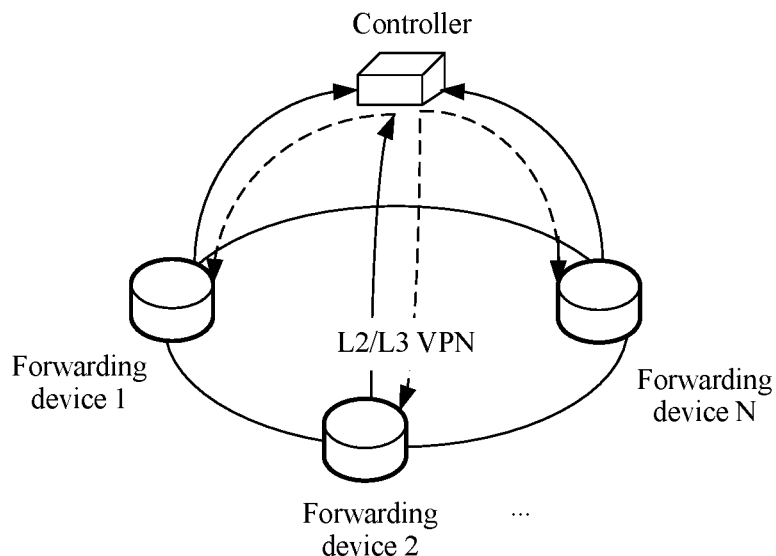
FIG. 1 is a schematic diagram of a system framework applied to a FlowSpec message processing method according to an embodiment of the present disclosure.

FIG. 1 is a schematic diagram of a system framework applied to a FlowSpec message processing method according to an embodiment of the present disclosure. In this embodiment of the present disclosure, a controller and a forwarding device may perform information control and exchange. For example, the controller and the forwarding device may communicate with each other by using the BGP. For example, there are N forwarding devices in FIG. 1, where N is a non-zero natural number. A forwarding device 1, a forwarding device 2, . . . , and a forwarding device N may apply an L2/L3 virtual private network (VPN) service under service control of the controller. This is only description of an example herein. In this embodiment of the present disclosure, the controller may collect information about a forwarding device interface of the forwarding device. For example, the forwarding device interface may be an external interface of a network edge forwarding device, for example, an L2 or L3 service interface, so that the controller centrally deploys a service policy applied to a forwarding device interface of a specified forwarding device. For example, a flow steering policy is deployed on access circuit (AC) interfaces of all specified Ethernet virtual private network (EVPN) instances. A specific implementation is reflected as follows: A BGP FlowSpec message is further extended, and an application interface rule is added to a FlowSpec rule while the FlowSpec rule is disseminated, so that the forwarding device may select an appropriate local forwarding device interface to which the FlowSpec rule is applied. The following separately describes the FlowSpec message processing method provided in the embodiments of the present disclosure in detail from perspectives of the controller and the forwarding device.

Figure 2:
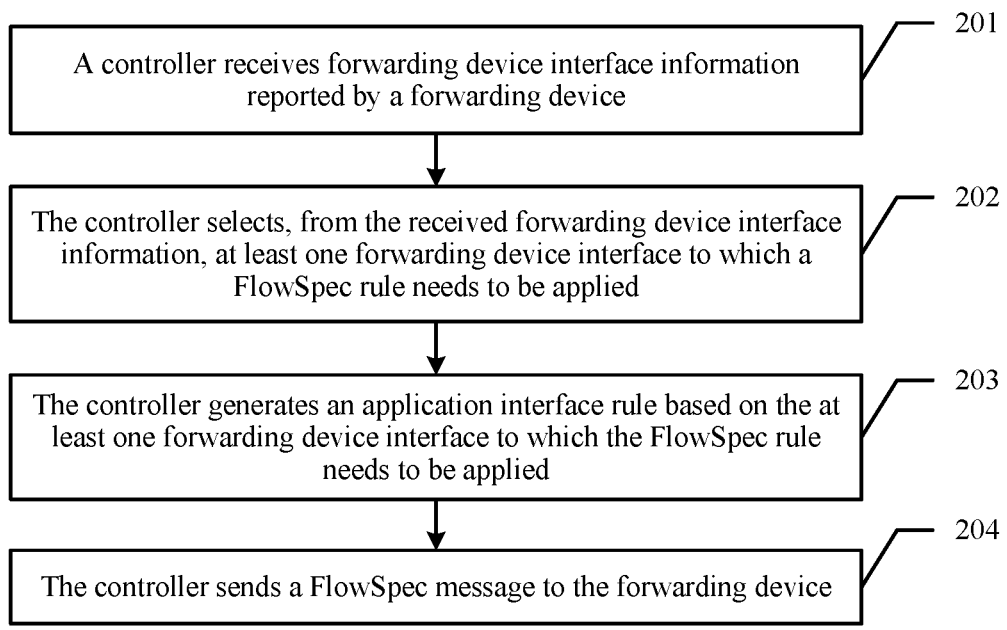
FIG. 2 is a schematic block flowchart of a FlowSpec message processing method according to an embodiment of the present disclosure.

An embodiment of the information processing method of the present disclosure may be applied to a controller side. Referring to FIG. 2, a FlowSpec message processing method provided in an embodiment of the present disclosure may include the following operations.

201. The controller receives forwarding device interface information reported by a forwarding device.

In this embodiment of the present disclosure, the controller is a control-plane device, and the controller may exchange information with the forwarding device. The controller may be a device independently deployed on a control network, or may be a control module deployed on a forwarding device. In other words, the control module may be deployed on a forwarding device, to control a service of the forwarding device. For example, in this embodiment of the present disclosure, the controller may be a route reflector (RR), or the controller may be implemented by extending a FlowSpec message processing function of the RR in this embodiment of the present disclosure. The forwarding device provided in this embodiment of the present disclosure may be a device that supports the BGP protocol and establishes a BGP protocol session with another device. For example, the forwarding device may be a provider edge (PE) device, or the forwarding device may be a customer edge (CE) device.

In this embodiment of the present disclosure, the controller and the forwarding device may establish the BGP session. The forwarding device reports the forwarding device interface information of the forwarding device to the controller by using the BGP session. A forwarding device interface reported by the forwarding device may be a physical interface or a logical interface. For example, the forwarding device may be a PE device, and the PE device reports an AC interface identifier (ID) of the PE device to the controller. The controller may receive, by using the BGP session, the forwarding device interface information reported by the forwarding device. In this embodiment of the present disclosure, the controller may separately establish a BGP session with a plurality of forwarding devices, so that the controller may separately receive forwarding device interface information reported by the plurality of forwarding devices.

It should be noted that, in this embodiment of the present disclosure, the forwarding device interface information reported by the forwarding device to the controller may be implemented in a plurality of manners. A specific type of forwarding device interface information to be reported needs to be determined with reference to an application scenario. The type of the forwarding device interface information to be reported may be determined by the forwarding device, may be determined by the controller, or may be determined by the controller and the forwarding device through negotiation. This is not limited herein. The following describes an implementation of the forwarding device interface information by using an example.

In some embodiments of the present disclosure, the forwarding device interface information reported by the forwarding device to the controller may include interface information of the forwarding device and device information of the forwarding device. The forwarding device may report the interface information of the forwarding device to the controller. The forwarding device reports the forwarding device interface information of the forwarding device and the device information of the forwarding device to the controller. The forwarding device interface information of the forwarding device is information used to describe the forwarding device interface of the forwarding device, and the device information of the forwarding device is device information used to describe the forwarding device.

In some embodiments of the present disclosure, the device information of the forwarding device includes a BGP identifier. A value of the BGP identifier may be represented as a router ID, which is used to uniquely identify a forwarding device on an entire network. The device information of the forwarding device is described in detail by using an example in a subsequent embodiment. If there are a plurality of forwarding devices, each forwarding device may report a BGP identifier of the forwarding device to the controller.

In some embodiments of the present disclosure, the interface information of the forwarding device may include at least one of the following information: interface identifier information, interface description information, interface service information, and interface group information. The interface descriptors information of the forwarding device is defined in IEEE 802.1AB. The interface information is additional description of an interface, for example, description of a current service function of the interface. The interface identifier information is used to identify the forwarding device interface of the forwarding device. The interface description information is information used to describe the forwarding device interface of the forwarding device. The interface service information is used to describe an interface service type or the like. For example, the interface service information may be an L3VPN, an L2VPN, an EVPN, or the like. A value of the interface group information may be an interface group ID, which is a 32-bit value or a universally unique identifier (UUID). The interface information of the forwarding device is described in detail by using an example in a subsequent embodiment.

Further, in some embodiments of the present disclosure, the interface service information is one of the following types of information: virtual private LAN service (VPLS) information, virtual private wire service (VPWS) information, EVPN information, and layer 3 virtual private network (L3VPN) information. A specific type of the interface service information may be determined with reference to an application scenario.

In some other embodiments of the present disclosure, the interface service information may include at least one of the following information: VPN instance name information, VPN instance ID information, route distinguisher (RD) information, an import route target (RT), an export RT, and an Ethernet segment identifier (ESI). The interface service information of the forwarding device is described in detail by using an example in a subsequent embodiment.

In some embodiments of the present disclosure, operation 201 in which the controller receives forwarding device interface information reported by a forwarding device includes:

A1. The controller receives, by using the Border Gateway Protocol-Link State (BGP-LS) protocol, the forwarding device interface information reported by the forwarding device.

In current BGP-LS related drafts, the BGP-LS particularly refers to a BGP-based protocol mechanism for disseminating link states. The BGP-LS is defined to collect topology information of the Interior Gateway Protocol (IGP), the BGP protocol, and static configuration (attributes such as a node, a link, a prefix, and whether to carry bandwidth information), and is mainly used to provide topology information for a control device that centrally performs path computation, such as a path computation element (PCE), so that the control device performs path computation, to optimize network routing. However, fine-grained control over a service flow of a device cannot be implemented by using the current BGP-LS. In this embodiment of the present disclosure, the controller and the forwarding device may be applied to a BGP-LS application scenario. The controller may receive, by using the BGP-LS protocol, layer L2 forwarding device interface information of a forwarding device separately reported by forwarding devices, to resolve a problem that only layer L3 interface information can be collected by using the current BGP-LS, and interface information. The BGP-LS in this embodiment of the present disclosure is extended to collect interface information, particularly, the layer L2 forwarding device interface information.

202. The controller selects, from the received forwarding device interface information, at least one forwarding device interface to which a FlowSpec rule needs to be applied.

In this embodiment of the present disclosure, the controller creates the flow specification (FlowSpec) rule. The FlowSpec rule may also be referred to as a FlowSpec route or a BGP FlowSpec rule. The FlowSpec rule may be implemented in a plurality of manners. The FlowSpec rule may be defined by a user or by the controller. For example, the user may configure the FlowSpec rule on the controller, or the controller and a network traffic analyzer are associated and automatically generate a FlowSpec rule for preventing denial of service (DoS) and distributed denial of service (DDoS) attacks. The BGP FlowSpec is a standard routing protocol. A mechanism provided by the protocol can mitigate a DDoS attack when a routing infrastructure and a local DDoS solution are correctly integrated.

In this embodiment of the present disclosure, after the controller creates the FlowSpec rule, the controller may determine, with reference to the forwarding device interface information of the forwarding device obtained in operation 201, forwarding device interface(s) to which the FlowSpec rule needs to be applied. The forwarding interface to which the FlowSpec rule needs to be applied, determined by the controller, may be one or more forwarding device interfaces. This is not limited herein.

The current BGP FlowSpec may support transferring of a fine-grained flow policy or routing similar to an access control list (ACL) or a policy-based routing (PBR). However, the BGP FlowSpec cannot accurately specify a forwarding device interface to which the FlowSpec rule is applied. In this embodiment of the present disclosure, the forwarding device may report the forwarding device interface information of the forwarding device to the controller. When configuring the FlowSpec rule, the controller may configure, by using the received forwarding device interface information, the forwarding device interface to which the FlowSpec rule needs to be applied, so that the controller determines, on a control plane, specific forwarding interfaces to which the FlowSpec rule can be applied, implementing fine-grained control over the FlowSpec rule.

203. The controller generates an application interface rule based on the at least one forwarding device interface to which the FlowSpec rule needs to be applied.

The application interface rule is used to instruct the forwarding device to determine a forwarding device interface to which the FlowSpec rule can be applied.

In this embodiment of the present disclosure, after the operation 202 in which the controller determines at least one forwarding device interface to which a FlowSpec rule needs to be applied, the controller may generate the application interface rule. The application interface rule may be sent to the forwarding device by using a FlowSpec message. The application interface rule generated by the controller may be used to instruct the forwarding device to determine the forwarding device interface to which the FlowSpec rule can be applied. The application interface rule may be implemented in a plurality of manners. The following describes in detail how the controller is instructed to determine, by using the application interface rule, the at least one forwarding device interface to which the FlowSpec rule needs to be applied.

204. The controller sends a FlowSpec message to the forwarding device.

The FlowSpec message includes the application interface rule and the FlowSpec rule.

In this embodiment of the present disclosure, after the controller configures, for the FlowSpec rule, the at least one forwarding device interface to which the FlowSpec rule needs to be applied, the controller may generate the application interface rule. The controller sends the FlowSpec message to the forwarding device. For example, the controller may send the FlowSpec message to the forwarding device by using a BGP session, and the forwarding device may determine, by using the application interface rule carried in the FlowSpec message, the at least one forwarding device interface to which the FlowSpec rule needs to be applied.

In some embodiments of the present disclosure, the forwarding device interface information includes an interface identifier of the forwarding device interface. In other words, the forwarding device reports the interface identifier of the forwarding device interface to the controller. In this implementation scenario, the controller may determine a specific implementation of the application interface rule in the following manner. Operation 203 in which the controller generates an application interface rule based on the at least one forwarding device interface to which the FlowSpec rule needs to be applied may include the following operations.

B1. The controller obtains at least one interface identifier corresponding to the at least one forwarding device interface to which the FlowSpec rule needs to be applied.

B2. The controller generates the application interface rule, where the application interface rule includes an interface identifier set, and the interface identifier set includes at least one interface identifier corresponding to the at least one forwarding device interface to which the FlowSpec rule needs to be applied.

The controller receives the interface identifier sent by the forwarding device, and the controller may configure an identifier of an interface that uses the FlowSpec rule. After the controller determines the at least one forwarding device interface to which the FlowSpec rule needs to be applied, the controller obtains, based on a mapping relationship between an interface identifier and a forwarding device interface, the at least one interface identifier corresponding to the at least one forwarding device interface to which the FlowSpec rule needs to be applied. The controller generates the application interface rule, where the application interface rule includes the interface identifier set, and the interface identifier set includes the at least one interface identifier corresponding to the at least one forwarding device interface to which the FlowSpec rule needs to be applied.

The controller determines that the application interface rule is the interface identifier set, and the controller sends, to the forwarding device, a FlowSpec message carrying the interface identifier set. After receiving the FlowSpec rule, the forwarding device may obtain, from the interface identifier set, the at least one interface identifier corresponding to the at least one forwarding device interface to which the FlowSpec rule needs to be applied, so that the forwarding device may determine whether the forwarding device interface corresponding to a local device includes the at least one interface identifier corresponding to the at least one forwarding device interface to which the FlowSpec rule needs to be applied.

In some embodiments of the present disclosure, the forwarding device interface belongs to different interface groups based on pre-configuration of the controller. In this implementation scenario, the controller may determine a specific implementation of the application interface rule in the following manner. Operation 203 in which the controller generates an application interface rule based on the at least one forwarding device interface to which the FlowSpec rule needs to be applied may include the following operations:

C1. The controller determines an interface group to which the at least one forwarding device interface to which the FlowSpec rule needs to be applied belongs.

C2. The controller obtains an interface group identifier corresponding to the interface group to which the at least one forwarding device interface to which the FlowSpec rule needs to be applied belongs.

C3. The controller generates the application interface rule, where the application interface rule includes the interface group identifier.

The controller receives the interface identifier of the forwarding device sent by the forwarding device, and the controller may configure an identifier of an interface that is of the forwarding device and that uses the FlowSpec rule. After the controller determines the at least one forwarding device interface to which the FlowSpec rule needs to be applied, the controller obtains, based on a mapping relationship between an interface group identifier and an interface identifier, the interface group identifier corresponding to the interface group to which the at least one forwarding device interface to which the FlowSpec rule needs to be applied belongs. That the controller determines the application interface rule is implemented by using the interface group identifier. If the controller determines that the at least one forwarding device interface to which the FlowSpec rule needs to be applied belongs to a plurality of different interface group, the controller needs to separately determine an interface group identifier corresponding to each interface group.

After the controller generates the application interface rule, the controller sends, to the forwarding device, a FlowSpec message carrying the interface group identifier. After receiving the FlowSpec message, the forwarding device may obtain the interface group identifier from the FlowSpec message, and obtain, by using the interface group identifier, at least one interface identifier corresponding to the at least one forwarding device interface to which the FlowSpec rule needs to be applied, so that the forwarding device may determine whether the forwarding device interface corresponding to the local device includes the at least one forwarding device interface to which the FlowSpec rule needs to be applied.

Further, in some embodiments of the present disclosure, before operation C1 in which the controller determines the interface group to which the at least one forwarding device interface to which the FlowSpec rule needs to be applied belongs, the FlowSpec message processing method provided in this embodiment of the present disclosure may include the following operations.

D1. The controller creates an interface group identifier and/or an interface identifier of a forwarding device interface included in the interface group.

D2. The controller sends the interface group identifier and/or the interface identifier of the forwarding device interface included in the interface group to the forwarding device.

The controller may pre-configure an identifier of an interface group, and also configure specific forwarding device interfaces included in the interface group. For example, the controller may pre-configure two interface groups: an interface group A and an interface group B. For the two configured interface groups, the controller may separately configure an interface identifier of a forwarding device interface specifically included in each interface group. For example, the controller may configure the interface group A to include an interface identifier 1 and an interface identifier 2, and configure the interface group B to include the interface identifier 1 and an interface identifier 3. The forwarding device interface identifier 1 of the forwarding device may belong to two interface groups, or the forwarding device interface identifier 1 may be configured to belong to one interface group according to an actual scenario. This is not limited herein. After the controller pre-configures the interface group, the controller may deliver interface group information configured in operation D1 to the forwarding device, so that the forwarding device may obtain a mapping relationship between the interface group and the interface identifier.

In some embodiments of the present disclosure, operation 203 in which the controller generates an application interface rule based on the at least one forwarding device interface to which the FlowSpec rule needs to be applied may include the following operation:

E1. The controller generates the application interface rule, where the application interface rule includes a service filter criterion, and the service filter criterion is used to obtain through filtering, from the device interface information, the at least one forwarding device interface to which the FlowSpec rule needs to be applied.

After the controller determines the at least one forwarding device interface to which the FlowSpec rule needs to be applied, the controller may configure the service filter criterion based on the at least one forwarding device interface to which the FlowSpec rule needs to be applied. The controller determines that the application interface rule may be the service filter criterion. The service filter criterion may also be referred to as an interface filter criterion. The service filter criterion is used to obtain through filtering the at least one forwarding device interface to which the FlowSpec rule needs to be applied. In other words, the controller configures the service filter criterion based on a criterion that can be used to obtain the at least one forwarding device interface to which the FlowSpec rule needs to be applied.

The controller generates the application interface rule. The application interface rule includes the service filter criterion, and the controller sends, to the controller, a FlowSpec message carrying the service filter criterion. After receiving the FlowSpec message, the forwarding device may perform matching on a local forwarding device interface of the forwarding device based on the service filter criterion, so that the forwarding device may determine whether the local forwarding device interface includes the at least one forwarding device interface to which the FlowSpec rule needs to be applied.

In some embodiments of the present disclosure, operation 204 in which the controller sends a FlowSpec message to the forwarding device may include the following operation:

F1. The controller sends the FlowSpec message to the forwarding device by using BGP route attribute information, where the BGP route attribute information carries the application interface rule.

When the controller sends, to the forwarding device, the FlowSpec message carrying the application interface rule, the controller may use the BGP route attribute information to carry the application interface rule. For example, the application interface rule may be added to an existing field of the BGP route attribute information, or the application interface rule may be added to a new field by extending the BGP route attribute information. For details, refer to description of an example in a subsequent application scenario.

Further, in some embodiments of the present disclosure, the BGP route attribute information includes at least one of the following information: flow extended attribute information, extended communities attribute (ECA) information of an interface group, and service filter attribute information. The BGP route attribute information is described in detail by using an example in a subsequent embodiment.

It can be learned from the description of the example in the foregoing embodiment of the present disclosure, the forwarding device reports the forwarding device interface information of the forwarding device to the controller. Therefore, when delivering the FlowSpec rule, the controller may configure, based on the received forwarding device interface information, a forwarding device interface to which the FlowSpec rule needs to be applied, so that the controller may configure specific forwarding device interface(s) to which the FlowSpec rule needs to be applied, and generate a corresponding application interface rule. In this embodiment of the present disclosure, the controller may control one FlowSpec rule to apply to a flexibly specified forwarding device interface on the forwarding device, so that an application range of the flow rule is specified automatically and flexibly according to a user's requirement, and the controller may perform fine-grained control over a service for the FlowSpec rule, thereby resolving an existing problem that control over a service flow of the forwarding device is not fine-grained.

The foregoing embodiment describes the FlowSpec message processing method provided in the embodiment of the present disclosure from a perspective of the controller side. The following describes a FlowSpec message processing method provided in the embodiment of the present disclosure from a perspective of a forwarding device. Referring to FIG. 3, the FlowSpec message processing method provided in this embodiment of the present disclosure may include the following operations.

301. The forwarding device reports forwarding device interface information of the forwarding device to a controller.

In this embodiment of the present disclosure, the controller is a control-plane device, and the controller may exchange information with the forwarding device. For example, the controller may communicate with the forwarding device by using the BGP. For example, the forwarding device provided in this embodiment of the present disclosure may be a device that supports the BGP protocol and establishes a BGP protocol session with another device. For example, the forwarding device may be a PE device, or the forwarding device may be a CE device.

In this embodiment of the present disclosure, the controller and the forwarding device may establish the BGP session. The forwarding device reports the forwarding device interface information of the forwarding device to the controller by using the BGP session. A forwarding device interface reported by the forwarding device may be a physical interface or a logical interface. For example, the forwarding device may be a PE device, and the PE device reports an AC interface identifier of the PE device to the controller. The controller may receive, by using the BGP session, the forwarding device interface information reported by the forwarding device. In this embodiment of the present disclosure, the controller may separately establish a BGP session with a plurality of forwarding devices, and each forwarding device may independently perform operation 301.

In some embodiments of the present disclosure, the forwarding device interface information reported by the forwarding device to the controller may include interface information of the forwarding device and device information of the forwarding device. The forwarding device may report the interface information of the forwarding device and the device information of the forwarding device to the controller. The interface information of the forwarding device is information used to describe the forwarding device interface of the forwarding device, and the device information of the forwarding device is device information used to describe the forwarding device.

In some embodiments of the present disclosure, the device information of the forwarding device includes a BGP identifier. A value of the BGP identifier may be represented as a router ID, which is used to uniquely identify a forwarding device on an entire network. The device information of the forwarding device is described in detail by using an example in a subsequent embodiment. If there are a plurality of forwarding devices, each forwarding device may report a BGP identifier of the forwarding device to the controller.

In some embodiments of the present disclosure, the interface information of the forwarding device includes at least one of the following information: interface identifier information, interface description information, interface service information, and interface group information. The interface information of the forwarding device is defined in IEEE 802.1AB. The interface information is additional description of an interface, for example, description of a current service function of the interface. The interface identifier information is used to identify the forwarding device interface of the forwarding device. The interface description information is information used to describe the forwarding device interface of the forwarding device. The interface service information is used to describe an interface service type or the like. For example, the interface service information may be an L3VPN, an L2VPN, an EVPN, or the like. A value of the interface group information may be an interface group ID, which may be a 32-bit value or a UUID. The forwarding device interface information of the forwarding device is described in detail by using an example in a subsequent embodiment.

Further, in some embodiments of the present disclosure, the interface service information is one of the following types of information: virtual private LAN service information, virtual private wire service information, EVPN information, and layer 3 virtual private network information. A specific type of the interface service information may be determined with reference to an application scenario.

In some other embodiments of the present disclosure, the interface service information may include at least one of the following information: virtual private network (VPN) instance name information, VPN instance ID information, route distinguisher information, an import route target, an export route target, and an Ethernet segment identifier. The forwarding device interface service information of the forwarding device is described in detail by using an example in a subsequent embodiment.

In some embodiments of the present disclosure, operation 301 in which the forwarding device reports forwarding device interface information of the forwarding device to a controller includes:

The forwarding device reports the forwarding device interface information of the forwarding device to the controller by using the Border Gateway Protocol-Link State (BGP-LS).

In current BGP-LS related drafts, the BGP-LS particularly refer to a BGP-based protocol mechanism for disseminating link states. The BGP-LS is defined to collect topology information (such as a node attribute, a link attribute, a prefix attribute, and an attribute for whether to carry bandwidth information, and other attributes) of the IGP and BGP protocols and static configuration, and is mainly used to provide topology information for a control device that centrally performs path computation, such as a PCE, so that the control device performs path computation, to optimize network routing. However, fine-grained control over a service flow of a device cannot be implemented by using the current BGP-LS. In this embodiment of the present disclosure, the controller and the forwarding device may be applied to a BGP-LS application scenario. The forwarding device may report, by using the BGP-LS protocol, layer L2 forwarding device interface information of the forwarding device, to resolve a problem that only layer L3 interface information can be collected by using the current BGP-LS. The BGP-LS in this embodiment of the present disclosure is extended to collect interface information, particularly, the layer L2 forwarding device interface information.

302. The forwarding device receives a FlowSpec message sent by the controller, and obtains, from the FlowSpec message, an application interface rule and a FlowSpec rule.

In this embodiment of the present disclosure, the controller may send, to the forwarding device by using the BGP session, a FlowSpec message carrying the application interface rule. The application interface rule may be used by the forwarding device to determine at least one forwarding device interface to which the FlowSpec rule needs to be applied.

303. The forwarding device determines, according to the application interface rule, whether a forwarding device interface of the forwarding device includes at least one forwarding device interface to which the FlowSpec rule needs to be applied.

In this embodiment of the present disclosure, after the forwarding device obtains the application interface rule from the FlowSpec message, the forwarding device may further determine specific content indicated by the application interface rule. The application interface rule is configured by the controller side, and the forwarding device may parse the application interface rule in a manner used by the controller to configure the application interface rule. The application interface rule may be implemented in a plurality of manners. The following describes in detail how the forwarding device obtains, by using the application interface rule, the at least one forwarding device interface to which the FlowSpec rule needs to be applied.

In some embodiments of the present disclosure, the forwarding device reports a forwarding device interface identifier of the forwarding device to the controller. In this implementation scenario, the forwarding device may determine a specific implementation of the application interface rule in the following manner. When the application interface rule is an interface identifier set, operation 303 in which the forwarding device determines, according to the application interface rule, whether a forwarding device interface of the forwarding device includes at least one forwarding device interface to which the FlowSpec rule needs to be applied may include the following operations:

G1. The forwarding device obtains the interface identifier from the interface identifier set.

G2. The forwarding device searches an interface identifier corresponding to the forwarding device interface of the forwarding device for the interface identifier in the interface identifier set.

After receiving the FlowSpec message, the forwarding device obtains the interface identifier set from the FlowSpec message. The forwarding device may obtain the interface identifier from the interface identifier set, so that the forwarding device searches the forwarding device interface identifier corresponding to the local forwarding device interface for at least one interface identifier.

In some embodiments of the present disclosure, the forwarding device interface belongs to different interface groups based on pre-configuration of the controller. In this implementation scenario, the forwarding device may determine a specific implementation of the application interface rule in the following manner. When the application interface rule is an interface group identifier, operation 303 in which the forwarding device determines, according to the application interface rule, whether a forwarding device interface of the forwarding device includes at least one forwarding device interface to which the FlowSpec rule needs to be applied may include the following operations:

H1. The forwarding device obtains an interface group based on the interface group identifier.

H2. The forwarding device searches the forwarding device interface of the forwarding device for a forwarding device interface included in the interface group.

After receiving the FlowSpec message, the forwarding device obtains the interface group identifier from the FlowSpec message. The forwarding device may determine, based on the interface group identifier, that the interface group identifier is corresponding to the interface group, and determine which forwarding device interface(s) in the interface group belong(s) to the at least one forwarding device interface to which the FlowSpec rule needs to be applied, so that the forwarding device may determine whether the local forwarding device interface includes the forwarding device interface included in the interface group.

Further, in some embodiments of the present disclosure, before operation 303 in which the forwarding device determines, according to the application interface rule, whether a forwarding device interface of the forwarding device includes at least one forwarding device interface to which the FlowSpec rule needs to be applied, the FlowSpec message processing method provided in this embodiment of the present disclosure includes:

I1. The forwarding device receives an interface group identifier delivered by the controller and an interface identifier of the forwarding device interface included in the interface group.

I2. The forwarding device selects the forwarding device interface of the forwarding device based on the interface group identifier and the interface identifier of the forwarding device interface included in the interface group, and maintains an association relationship between the forwarding device interface of the forwarding device and the interface group.

The controller may pre-configure an identifier of an interface group, and also configure specific forwarding device interfaces included in the interface group. After the controller pre-configures the interface group, the controller may deliver configured interface group information to the forwarding device, so that the forwarding device may obtain a mapping relationship between the interface group and the interface identifier. The forwarding device may select the forwarding device interface of the forwarding device based on the interface group identifier and the interface identifier of the forwarding device interface included in the interface group, and maintain the association relationship between the forwarding device interface of the forwarding device and the interface group. After the controller delivers the interface group information, the forwarding device maintains a forwarding device interface that is included in the forwarding device interface of the forwarding device and that has an association relationship with the interface group information delivered by the controller, so that the forwarding device may query the mapping relationship between the interface group and the interface group identifier while performing operation H1 and operation H2, and determine, by using the interface group, the forwarding device interface included in the interface group.

In some embodiments of the present disclosure, the forwarding device reports the forwarding device interface identifier of the forwarding device to the controller. In this implementation scenario, the forwarding device may determine a specific implementation of the application interface rule in the following manner. When the application interface rule is a service filter criterion, operation 303 in which the forwarding device determines, according to the application interface rule, whether a forwarding device interface of the forwarding device includes at least one forwarding device interface to which the FlowSpec rule needs to be applied may include the following operation:

J1. The forwarding device searches the forwarding device interface of the forwarding device for a forwarding device interface meeting the service filter criterion; and if the forwarding device interface of the forwarding device includes a forwarding device interface meeting the service filter criterion, determines that the forwarding device includes the at least one forwarding device interface to which the FlowSpec rule needs to be applied, or if the forwarding device interface of the forwarding device does not include a forwarding device interface meeting the service filter criterion, determines that the forwarding device interface of the forwarding device does not include the at least one forwarding device interface to which the FlowSpec rule needs to be applied.

The service filter criterion is configured by the controller. After obtaining the service filter criterion from the FlowSpec message, the forwarding device may use the service filter criterion to select the forwarding device interface of the forwarding device, so as to determine whether the forwarding device interface of the forwarding device includes the at least one forwarding device interface to which the FlowSpec rule needs to be applied.

304. When the forwarding device interface of the forwarding device includes the at least one forwarding device interface to which the FlowSpec rule needs to be applied, the forwarding device installs the FlowSpec rule and applies the FlowSpec rule to the at least one forwarding device interface to which the FlowSpec rule needs to be applied.

In this embodiment of the present disclosure, based on the determining process in operation 303, when the forwarding device interface of the forwarding device includes the at least one forwarding device interface to which the FlowSpec rule needs to be applied, it indicates that the forwarding device includes at least one forwarding device interface to which the FlowSpec rule needs to be applied and that matches the FlowSpec rule. Then, the forwarding device may install the FlowSpec rule and apply the FlowSpec rule to the at least one forwarding device interface, of the forwarding device, to which the FlowSpec rule needs to be applied. In this embodiment of the present disclosure, the forwarding device applies the FlowSpec rule to the at least one forwarding device interface to which the FlowSpec rule needs to be applied. In other words, only the at least one forwarding device interface to which the FlowSpec rule needs to be applied can receive a packet matching the FlowSpec rule, and performs FlowSpec rule processing. In this embodiment of the present disclosure, if the forwarding device includes another forwarding device interface in addition to the at least one forwarding device interface to which the FlowSpec rule needs to be applied, because the controller configures that only the at least one forwarding device interface to which the FlowSpec rule needs to be applied can match the FlowSpec rule, the another forwarding device interface on the forwarding device cannot perform FlowSpec rule matching processing, thereby implementing fine-grained processing on the FlowSpec rule. A service may be configured at an interface level, so that fine-grained processing on a service delivered by the controller can be implemented. It should be noted that, in this embodiment of the present disclosure, operation 304 can be performed only when the forwarding device includes the at least one forwarding device interface to which the FlowSpec rule needs to be applied. In addition, the FlowSpec rule is applied only to the at least one forwarding device interface that is of the forwarding device and to which the FlowSpec rule needs to be applied, instead of performing matching processing for the FlowSpec rule on packets received on all interfaces.

It can be learned from the description of the example in the foregoing embodiment of the present disclosure, the forwarding device in this embodiment of the present disclosure may report respective forwarding device interface information to the controller. Therefore, when delivering the FlowSpec rule, the controller may configure, based on the received forwarding device interface information, a forwarding device interface to which the FlowSpec rule needs to be applied, so that the controller may configure specific forwarding device interface(s) to which the FlowSpec rule needs to be applied, and generate a corresponding application interface rule. In this embodiment of the present disclosure, the controller may control one FlowSpec rule to be applied to a flexibly specified forwarding device interface on the forwarding device, so that an application range of the flow rule is specified automatically and flexibly according to a user's requirement, and fine-grained control over a service is implemented.

For better understanding and implementation of the foregoing solution of the embodiment of the present disclosure, the following provides detailed description by using a corresponding application scenario as an example.

In the current Link Layer Discovery Protocol (LLDP), although node information and physical interface information of a forwarding device can be disseminated within a layer 2 domain, a network controller reads an LLDP management information base (MIB) on the forwarding device by using network configuration (Netconf), to obtain L2 topology information discovered by the LLDP. However, transmission efficiency and real-time quality of the method neither meet a performance requirement for collecting a network topology by the network controller nor support discovery of a layer 2 logical interface (such as an L2 tunneling interface or bundling interface) or information about a service mounted on an interface.

In this embodiment provided in the present disclosure, the controller may collect information about a forwarding device interface (especially an external interface of a network edge forwarding device, for example, an L2 service interface) of a network forwarding device, so that the network controller centrally deploys a service policy applied to a specified device interface. For example, a flow steering policy is deployed on AC interfaces of all specified EVPN instances. A specific implementation is reflected as follows: The BGP FlowSpec rule is further extended, and the application interface rule such as the interface identifier set, the interface group ID, or interface filter criterion information is added while the FlowSpec message is disseminated. In the following, the controller is an extended route reflector. For example, the controller supports the FlowSpec message processing method implemented by the controller side described in this embodiment. The forwarding device is a BGP router, and the BGP router may instruct, according to the application interface rule, the BGP router to select a local appropriate forwarding device interface to which the FlowSpec rule is applied.

An application scenario of this embodiment of the present disclosure may include the following specific implementation operations:

1. On an L2/L3 VPN network, the BGP router (for example, a PE) reports forwarding device interface information to the network controller by using an extended BGP-LS. For example, the forwarding device interface information that can be reported by the PE includes information (including interface description and node description) about an interface (including a logical interface) such as an AC interface, so that network topology information with information about a mounted service may be formed. If a device interface is configured with an EVPN/L3VPN service, the interface is a service mounting point. The forwarding device interface information is defined based on a device interface identifier and service information configured on an interface, and is reported to the controller by the BGP router by using the extended BGP protocol in this embodiment of the present disclosure.

2. The controller creates a FlowSpec rule according to a user policy, and specifies, based on a network topology, a forwarding device interface to which the FlowSpec rule is applied (that is, the at least one forwarding device interface to which the FlowSpec rule needs to be applied), so as to generate an application interface rule. For example, for all AC interfaces on a VPN1, the controller may generate the application interface rule, and adds the application interface rule to the FlowSpec rule. For example, the controller obtains through filtering, from the network topology, all AC interfaces meeting a criterion as an additional attribute of the FlowSpec rule, and delivers the FlowSpec rule to a client BGP router of the controller.

3. After receiving the FlowSpec message, the BGP router performs at least one of the following checks:
  (1) If the FlowSpec message carries an interface identifier set (which may be carried in a specified path attribute), check whether the interface identifier set includes a local forwarding device interface.
  (2) If the FlowSpec message carries an interface group ID, check whether a forwarding device interface of the forwarding device includes a forwarding device interface corresponding to the interface group ID. One interface group may carry one or more interface identifiers, and the interface identifier may be a UUID or a combination of a device ID and an interface ID.
  (3) If the FlowSpec message carries a service filter criterion (also referred to as a service attribute filter criterion, an interface filter criterion, or the like) for an application interface, filter a forwarding device interface according to the service attribute filter criterion to check whether a forwarding device interface matches the service attribute filter criterion.

If the BGP router determines, based on any one of determining process in operations (1), (2), and (3), that the forwarding device interface includes the at least one forwarding device interface to which the FlowSpec rule needs to be applied, the BGP router checks and installs the FlowSpec rule, and specifies that the FlowSpec rule is applied to the at least one forwarding device interface to which the FlowSpec rule needs to be applied. The FlowSpec rule is applied to the at least one forwarding device interface to which the FlowSpec rule needs to be applied. In other words, it is limited that FlowSpec rule matching processing is performed only on a packet that is received on the at least one forwarding device interface to which the FlowSpec rule needs to be applied. If the FlowSpec rule is not applied, FlowSpec rule matching processing needs to be performed on packets received on all interfaces. The BGP FlowSpec (RFC 5575) defines a validity check mechanism for the FlowSpec rule. Installation is to deliver a valid and optimized FlowSpec rule to a forwarding plane of the forwarding device, and instruct the forwarding plane of the forwarding device to process a received packet.

The following describes an implementation of an extended BGP-LS. FIG. 4-*a* is a schematic data structure diagram of interface NLRI according to an embodiment of the present disclosure. The extended BGP-LS supports the network layer reachability information (NLRI). To be determined (TBD) NLRI Type=5. A specific definition is shown in FIG. 4-*a*. A protocol-identifier (Protocol-ID) may be set to 5 to represent a static configuration type. An identifier represents a routing field of topology information, and occupies 64 bits. An identifier of an L2 AC interface may be a configured value. A node descriptor includes one or more sub-TLVs (Type, Length, Value), referred to as Sub-TLV in a subsequent embodiment. The node descriptor is a manner of defining an extendable option. The node descriptor and an interface descriptor are variables. Further, the node descriptor needs to include a BGP identifier (Identifier) sub-TLV. A value of the BGP identifier sub-TLV may be set to a router ID, which is used to uniquely identify a BGP router on an entire network. The BGP router is a device that supports the BGP protocol and establishes a BGP protocol session with another device, such as a PE or a CE. FIG. 4-*b* is a schematic data structure diagram of extended node descriptor sub-TLVs according to an embodiment. The extended node descriptor sub-TLVs include a BGP identifier, and a sub-TLV with a name of TBD1 is mandatory, and occupies four bits.

In some embodiments of the present disclosure, the interface descriptor (Interface Descriptors) includes one or more sub-TLVs, and needs to include an interface identifier (Interface Identifier) sub-TLV. A specific value of the interface identifier sub-TLV may be an interface identifier value. For example, for the value of the interface identifier sub-TLV, refer to a definition in section 8.5.3 of IEEE 802.1AB. The value of the interface identifier sub-TLV may be an interface name, which is used to uniquely identify an interface (the interface may be a physical interface or a logical interface) on a BGP router. Sub-TLVs such as other interface description information (Interface Description), an interface service (Interface Service), an interface group (Interface Group) may be optionally carried. A value of the interface group sub-TLV is an ID of an interface group to which the interface belongs. Interface group IDs are centrally deployed on an entire network. Optimally, the interface group IDs may be deployed by the controller in a single AS, to avoid cross-domain dissemination. If one interface NLRI carries a plurality of interface group sub-TLVs, the interface belongs to a plurality of interface groups; or if no interface group sub-TLV is carried, the interface does not belong to any interface group. The interface description information is defined in section 8.5.5 of Ref IEEE 802.1AB, and is additional description of an interface, for example, description of a current service function of the interface.

FIG. 4-*c* is a schematic data structure diagram of extended interface descriptor sub-TLVs according to an embodiment of the present disclosure. The extended interface descriptor sub-TLVs totally include: TBD2 (mandatory), TBD3 (optional), TBD4-7 (optional), and TBD14 (optional). TBD2 is forcibly written, and may represent an interface identifier. Lengths of TBD3, TBD4-7, and TBD14 are optional and may be determined with reference to an application scenario. TBD3 may represent interface description, TBD4-7 may represent an interface service, and TBD14 may represent an interface group. For a value of the interface identifier and a value of the interface description, reference may be made to definitions in section 8.5.3 of IEEE 802.1AB and section 8.5.5 of IEEE 802.1AB, respectively. The interface service and the interface group are manners of values recorded in this embodiment of the present disclosure. For example, for the value of the interface service, reference may be made to sub-TLVs described in FIG. 4-e, for example, values (value) in FIG. 4-e. The interface group may be a UUID or another integral number.

FIG. 4-d is a schematic data structure diagram of interface service sub-TLVs according to an embodiment of the present disclosure. For a reference definition of the interface service sub-TLVs, refer to FIG. 4-d. The interface service sub-TLVs include TBD4 (optional), TBD5 (optional), TBD6 (optional), and TBD7 (optional). The TBD4 (optional) represents an L2VPN (VPLS); the TBD5 (optional) represents an L2VPN (VPWS); the TBD6 (optional) represents an EVPN; and the TBD7 (optional) represents an L3VPN. Lengths of the L2VPN (VPLS), the L2VPN (VPWS), the EVPN, and the L3VPN are optional, and may be determined with reference to an application scenario. In addition, for values of the L2VPN (VPLS), the L2VPN (VPWS), the EVPN, and the L3VPN, reference may be made to the sub TLVs described in FIG. 4-e, for example, the values (value) in FIG. 4e.

Further, in some embodiments of the present disclosure, each interface service sub-TLV may include a VPN name (name), an RD, an import RT, an export RT, an ESI, and other sub-TLVs. As shown in FIG. 4-e, FIG. 4-e is a schematic data structure diagram of extended service (Extended Service) sub-TLVs according to an embodiment of the present disclosure. In the extended service sub-TLVs, TBD8 (mandatory) represents the VPN name, a length of the VPN name is optional, and a value of the VPN name may be a VPN instance name. TBD9 (optional) represents the RD, and the value of the RD may be an RD value. TBD10 (optional) represents the import RT, and the value of the import RT may be an RT value. TBD11 (optional) represents the export RT, and the value of the export RT may be an RT value. Lengths of the RD, the import RT, and the export RT all may be eight bits. TBD12 (optional) represents the ESI, a length of the TBD12 is optional, and a value of the TBD12 may be an ESI value. One interface service sub-TLV may include a plurality of import RT or export RT sub-TLVs. The ESI sub-TLV can be included only in an EVPN service sub-TLV.

The foregoing has described implementation scenarios of the forwarding device interface information of the forwarding device. The following describes the FlowSpec rule carrying the application interface rule, and provides at least the following three solutions.

In a first solution, the following operations are mainly included.

1. The controller applies the FlowSpec rule to one or more interface groups, delivers the BGP FlowSpec rule to each BGP router, and carries one or more specified types of BGP route attributes, where the BGP route attribute carries information about an interface identifier set to which the rule is applied. For example, bound interface sub-TLVs are carried in a flow extended attribute.

FIG. 4-f is a schematic data structure diagram of bound interface (Bound interface) sub-TLVs according to an embodiment of the present disclosure. TBD15 may be a bound interface sub-TLV, and the bound interface sub-TLV may have a length of two octets. In a definition of the bound interface sub-TLV, definitions of a node descriptor and an interface descriptor are the same as corresponding definitions in an interface NLRI of the BGP-LS.

2. After receiving the FlowSpec rule, the BGP router obtains an interface identifier set carried in the FlowSpec rule, checks whether the interface identifier set includes a forwarding device interface, and installs the FlowSpec rule and applies the FlowSpec rule to any detected forwarding device interface, where the FlowSpec rule is also referred to as a FlowSpec route.

In a second solution, the following operations are included.

1. The controller creates an interface group according to a service policy, and adds a group of interfaces (for example, all AC interfaces on an EVPN network) meeting a service requirement to corresponding interface group information, where the service policy is used to create the interface group.

2. The controller delivers BGP-LS interface NLRI (carrying an interface group sub-TLV) to each BGP router, each BGP router filters a local forwarding device interface, and stores an association relationship between the forwarding device interface and an interface group ID, for example, configures one or more associated interface group IDs in an interface attribute.

3. The controller applies the FlowSpec rule to the one or more interface groups, delivers the BGP FlowSpec rule to each BGP router, carries one or more extended communities attributes (ECA) of one or more interface groups, may use a flowspec interface-set ECA or carry one or more specified types of BGP route attributes (for example, a Flow Extended Attribute), where the BGP route attribute carries one or more interface group sub-TLVs. A definition of the interface group sub-TLV is the same as a definition of an interface group sub-TLV in BGP-LS interface NLRI.

4. After receiving the FlowSpec rule, the BGP router obtains interface groups to which the FlowSpec rule is applied, and installs the FlowSpec rule and applies the FlowSpec rule to forwarding device interfaces corresponding to these interface groups.

In a third solution, the following operations are mainly included.

1. The controller applies the FlowSpec rule to interfaces of a service type (for example, an interface bound to a specified EVI in an EVPN), where the FlowSpec rule carries one or more specified types of BGP route attributes (for example, a Flow Extended Attribute), and the BGP route attribute carries a service attribute filter criterion (Service filter sub-TLV). A definition of the service filter sub-TLV is the same as a definition of an interface service in BGP-LS interface NLRI.

2. After receiving the FlowSpec rule, the BGP router obtains the service attribute filter criterion carried in the FlowSpec rule, filters a local forwarding device interface according to the service attribute filter criterion, and installs the FlowSpec rule and applies the FlowSpec rule to a forwarding device interface matching the service attribute filter criterion.

In the foregoing embodiment of the present disclosure, the controller may include a network controller and an extended PCE device. The controller collects L2 interface information (for example, an interface ID and a key service attribute) of the forwarding device by using the BGP-LS. The controller instructs, by adding the application interface rule to a BGP FlowSpec message, a forwarded BGP router FlowSpec route to be applied to specific forwarding device interfaces. The FlowSpec route is installed only when these selected forwarding devices include a forwarding device interface, so that the controller can support service control of a network edge.

It can be learned from the description of the example in this embodiment of the present disclosure that, in this embodiment of the present disclosure, both information about internal topology of a network and interface about an external interface of a network edge can be collected by using the BGP-LS, so that a more complete network topology database is formed for use by various service applications. Both path computing on an internal network and service control over a network edge are supported, so that a control policy for fine-grained flow access can be implemented. Interface groups are defined according to a service characteristic, and the FlowSpec rule is defined to be applied to these interface groups, so that actions supported by the FlowSpec rule, such as redirection and rate limiting, can be executed for a specified service and a specified flow. Interface information support is provided, so that the BGP FlowSpec route is applied to a network layer L2/L3 interface; and the BGP FlowSpec route carries the application interface rule for dissemination. This implements fine-grained flow service control based on a device interface.

It should be noted that, to make the description brief, the foregoing method embodiments are expressed as a series of actions. However, persons skilled in the art should appreciate that the present disclosure is not limited to the described action sequence, because according to the present disclosure, some operations may be performed in other sequences or performed simultaneously. In addition, persons skilled in the art should also appreciate that all the embodiments described in this specification are preferred embodiments, and the related actions and modules are not necessarily mandatory to the present disclosure.

To better implement the foregoing solutions of the embodiments of the present disclosure, the following further provides related apparatuses for implementing the foregoing solutions.

Referring to FIG. 5-a, a controller 500 provided in an embodiment of the present disclosure may include a receiving module 501, an interface configuration module 502, an application interface rule generation module 503, and a sending module 504.

The receiving module 501 is configured to receive forwarding device interface information reported by a forwarding device.

The interface configuration module 502 is configured to select, from the received forwarding device interface information, at least one forwarding device interface to which a FlowSpec rule needs to be applied.

The application interface rule generation module 503 is configured to generate an application interface rule based on the at least one forwarding device interface to which the FlowSpec rule needs to be applied, where the application interface rule is used to instruct the forwarding device to determine a forwarding device interface to which the FlowSpec rule can be applied.

The sending module 504 is configured to send a FlowSpec message to the forwarding device, where the FlowSpec message includes the application interface rule and the FlowSpec rule.

In some embodiments of the present disclosure, the forwarding device interface information includes an interface identifier of the forwarding device interface.

The application interface rule generation module 503 is configured to: obtain at least one interface identifier corresponding to the at least one forwarding device interface to which the FlowSpec rule needs to be applied; and generate the application interface rule, where the application interface rule includes an interface identifier set, and the interface identifier set includes the at least one interface identifier corresponding to the at least one forwarding device interface to which the FlowSpec rule needs to be applied.

In some embodiments of the present disclosure, the application interface rule generation module 503 is configured to: determine an interface group to which the at least one forwarding device interface to which the FlowSpec rule needs to be applied belongs; obtain an interface group identifier corresponding to the interface group to which the at least one forwarding device interface to which the FlowSpec rule needs to be applied belongs; and generate the application interface rule, where the application interface rule includes the interface group identifier.

Further, in some embodiments of the present disclosure, referring to FIG. 5-b, the controller 500 includes: an interface group processing module 505, configured to: create the interface group identifier and an interface identifier of a forwarding device interface included in the interface group; and send the interface group identifier and the interface identifier of the forwarding device interface included in the interface group that are created to the forwarding device.

In some embodiments of the present disclosure, the application interface rule generation module 503 is configured to generate the application interface rule, where the application interface rule includes a service filter criterion, and the service filter criterion is used to select through filtering, from the forwarding device interface information, the at least one forwarding device interface to which the FlowSpec rule needs to be applied.

In some embodiments of the present disclosure, the sending module 503 is configured to send the FlowSpec message to the forwarding device by using BGP route attribute information, where the BGP route attribute information carries the application interface rule.

In some embodiments of the present disclosure, the BGP route attribute information includes at least one of the following information: flow extended attribute flow extended attribute information, extended communities attribute ECA information of an interface group interface group, and service filter attribute information.

In some embodiments of the present disclosure, the receiving module 501 is configured to receive, by using the Border Gateway Protocol-Link State (BGP-LS) protocol, the forwarding device interface information reported by the forwarding device.

It can be learned from the description of the example in the foregoing embodiment of the present disclosure, the forwarding device reports the forwarding device interface information of the forwarding device to the controller. Therefore, when delivering the FlowSpec rule, the controller may configure, based on the received forwarding device interface information, a forwarding device interface to which the FlowSpec rule needs to be applied, so that the controller may configure specific forwarding device interface(s) to which the FlowSpec rule needs to be applied, and generate a corresponding application interface rule. In this embodiment of the present disclosure, the controller may control one FlowSpec rule to be applied to a flexibly specified forwarding device interface on the forwarding device, so that an application range of the flow rule is specified automatically and flexibly according to a user's requirement, and fine-grained control over a service is implemented.

Referring to FIG. 6-a, a forwarding device 600 provided in an embodiment of the present disclosure may include a sending module 601, a receiving module 602, an interface identification module 603, and a FlowSpec rule application module 604.

The sending module 601 is configured to report forwarding device interface information of the forwarding device to a controller.

The receiving module 602 is configured to: receive a FlowSpec message sent by the controller; and obtain, from the FlowSpec message, an application interface rule and a FlowSpec rule.

The interface identification module 603 is configured to determine, according to the application interface rule, whether a forwarding device interface of the forwarding device includes at least one forwarding device interface to which the FlowSpec rule needs to be applied.

The FlowSpec rule application module 604 is configured to: when the forwarding device interface of the forwarding device includes the at least one forwarding device interface to which the FlowSpec rule needs to be applied, apply the FlowSpec rule to the at least one forwarding device interface to which the FlowSpec rule needs to be applied.

In some embodiments of the present disclosure, when the application interface rule is an interface identifier set, the interface identification module 603 is configured to: obtain an interface identifier from the interface identifier set; and search an interface identifier corresponding to the forwarding device interface of the forwarding device for the interface identifier in the interface identifier set.

In some embodiments of the present disclosure, when the application interface rule is an interface group identifier, the interface identification module 603 is configured to: obtain an interface group based on the interface group identifier; and search the forwarding device interface of the forwarding device for a forwarding device interface included in the interface group.

In some embodiments of the present disclosure, referring to FIG. 6-b, the forwarding device 600 further includes an interface group processing module 605, configured to: before the interface identification module 603 determines, according to the application interface rule, whether the forwarding device interface of the forwarding device includes the at least one forwarding device interface to which the FlowSpec rule needs to be applied, receive an interface group identifier and an interface identifier of the forwarding device interface included in the interface group that are delivered by the controller; and filter the forwarding device interface of the forwarding device based on the interface group identifier and the interface identifier of the forwarding device interface included in the interface group that are delivered by the controller, and maintain an association relationship between the forwarding device interface of the forwarding device and the interface group.

In some embodiments of the present disclosure, when the application interface rule is a service filter criterion, the interface identification module 603 is configured to: search the forwarding device interface of the forwarding device for a forwarding device interface meeting the service filter criterion; and if the forwarding device interface of the forwarding device includes the forwarding device interface meeting the service filter criterion, determine that the forwarding device includes the at least one forwarding device interface to which the FlowSpec rule needs to be applied, or if the forwarding device interface of the forwarding device does not include a forwarding device interface meeting the service filter criterion, determine that the forwarding device interface of the forwarding device includes at least one forwarding device interface to which the FlowSpec rule needs to be applied.

In some embodiments of the present disclosure, the forwarding device interface information includes interface information of the forwarding device and device information of the forwarding device.

In some embodiments of the present disclosure, the device information of the forwarding device includes a BGP identifier.

In some embodiments of the present disclosure, the interface information of the forwarding device includes at least one of the following information:

interface identifier interface identifier information, interface description interface description information, interface service interface service information, and interface group interface group information.

In some embodiments of the present disclosure, the interface service interface service information is one of the following types of information: virtual private LAN service (VPLS) information, virtual private wire service (VPWS) information, Ethernet virtual private network (EVPN) information, and layer 3 virtual private network (L3VPN) information.

In some embodiments of the present disclosure, the interface service interface service information includes at least one of the following information: VPN instance name VPN instance name information, VPN instance ID VPN instance ID information, route distinguisher RD information, an import route target import RT, an export route target export RT, and an Ethernet segment identifier ESI.

In some embodiments of the present disclosure, the sending module 601 is configured to report layer L2 device interface information of the forwarding device to the controller by using the Border Gateway Protocol-Link State BGP-LS.

It should be noted that content such as information exchange between the modules/units of the apparatus and the execution processes thereof is based on the same idea as the method embodiments of the present disclosure, and produces the same technical effects as the method embodiments of the present disclosure. For the specific content, reference may be made to the foregoing description in the method embodiments of the present disclosure, and details are not described herein again.

It can be learned from the description of the example in the foregoing embodiment of the present disclosure, the forwarding device in this embodiment of the present disclosure may report respective forwarding device interface information to the controller. Therefore, when delivering the FlowSpec rule, the controller may configure, based on the received forwarding device interface information, a forwarding device interface to which the FlowSpec rule needs to be applied, so that the controller may configure specific forwarding device interface(s) to which the FlowSpec rule needs to be applied, and generate a corresponding application interface rule. In this embodiment of the present disclosure, the controller may control one FlowSpec rule to be applied to a flexibly specified forwarding device interface on the forwarding device, so that an application range of the flow rule is specified automatically and flexibly according to a user's requirement, and fine-grained control over a service is implemented.

An embodiment of the present disclosure further provides a computer storage medium. The computer storage medium stores a program, and the program performs some or all of operations recorded in the foregoing method embodiments.

Figure 7:
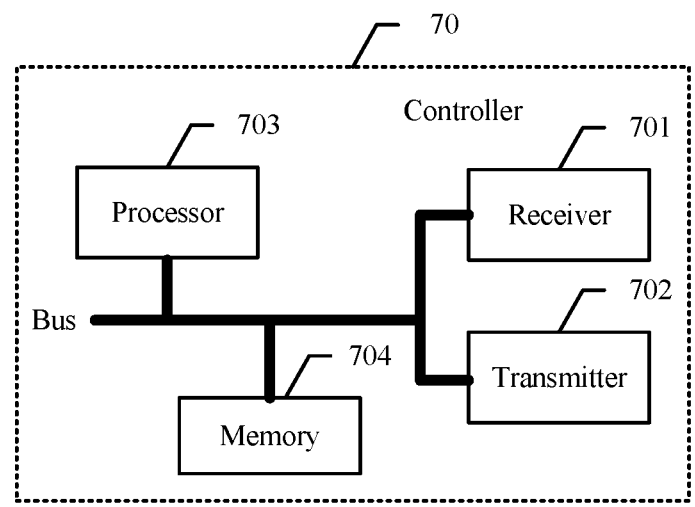
FIG. 7 is a schematic structural composition diagram of another controller according to an embodiment of the present disclosure.

The following describes another controller provided in an embodiment of the present disclosure. Referring to FIG. 7, the controller 700 includes:

a receiver 701, a transmitter 702, a processor 703, and a memory 704 (there may be one or more processors 703 on the controller 700, and one processor is used as an example in FIG. 7). In some embodiments of the present disclosure, the receiver 701, the transmitter 702, the processor 703, and the memory 704 may be connected by using a bus or in another manner. In FIG. 7, a bus connection is used as an example.

The memory 704 may include a read-only memory and a random access memory, and provide an instruction and data to the processor 703. A part of the memory 704 may further include a nonvolatile random access memory (NVRAM). The memory 704 stores an operating system and an operation instruction, an executable module or a data structure, a subset thereof, or an extended set thereof. The operation instruction may include various operation instructions, used to implement various operations. The operating system may include various system programs, used to implement various basic services and process hardware-based tasks.

The processor 703 controls an operation of the controller 700. The processor 703 may also be referred to as a central processing unit (CPU). In a specific application, all components of the controller 700 are coupled together by using a bus system. In addition to a data bus, the bus system may include a power bus, a control bus, a signal status bus, and the like. However, for clear description, various types of buses in the figure are referred to as the bus system.

The method disclosed in this embodiment of the present disclosure is applicable to the processor 703, or implemented by using the processor 703. The processor 703 may be an integrated circuit chip and has a signal processing capability. In an implementation process, operations in the foregoing methods can be implemented by using a hardware integrated logical circuit in the processor 703 or by using instructions in a form of software. The processor 703 may be a general purpose processor, a digital signal processor (DSP), an application-specific integrated circuit (ASIC), a field programmable gate array (FPGA) or another programmable logic device, a discrete gate or a transistor logic device, or a discrete hardware component. The processor 703 may implement or perform the methods, the operations, and logical block diagrams that are disclosed in the embodiments of the present disclosure. The general purpose processor may be a microprocessor, or the processor may be any conventional processor or the like. Operations of the methods disclosed with reference to the embodiments of the present disclosure may be directly executed and accomplished by using a hardware decoding processor, or may be executed and accomplished by using a combination of hardware and software modules in the decoding processor. A software module may be located in a mature storage medium in the art, such as a random access memory, a flash memory, a read-only memory, a programmable read-only memory, an electrically erasable programmable memory, a register, or the like. The storage medium is located in the memory 704, and the processor 703 reads information from the memory 704 and completes the operations in the foregoing methods in combination with hardware of the processor.

The receiver 701 may be configured to receive entered digital or character information, and generate signal input related to setting and function control of the controller. The transmitter 702 may include a display device such as a display screen. The transmitter 702 may be configured to output digital or character information by using an external interface.

In this embodiment of the present disclosure, the processor 703 is configured to perform the following operations:
  receiving forwarding device interface information reported by a forwarding device;
  selecting, from the received forwarding device interface information, at least one forwarding device interface to which a FlowSpec rule needs to be applied;
  generating an application interface rule based on the at least one forwarding device interface to which the FlowSpec rule needs to be applied, where the application interface rule is used to instruct the forwarding device to determine a forwarding device interface to which the FlowSpec rule can be applied; and
  sending a FlowSpec message to the forwarding device, where the FlowSpec message includes the application interface rule and the FlowSpec rule.

In some embodiments of the present disclosure, the forwarding device interface information includes an interface identifier of a forwarding device interface, and the processor 703 is configured to perform the following operations:
  obtaining at least one interface identifier corresponding to the at least one forwarding device interface to which the FlowSpec rule needs to be applied; and
  generating the application interface rule, where the application interface rule includes an interface identifier set, and the interface identifier set includes the at least one interface identifier corresponding to the at least one forwarding device interface to which the FlowSpec rule needs to be applied.

In some embodiments of the present disclosure, the processor 703 is configured to perform the following operations:
  determining an interface group to which the at least one forwarding device interface to which the FlowSpec rule needs to be applied belongs;
  obtaining an interface group identifier corresponding to the interface group to which the at least one forwarding device interface to which the FlowSpec rule needs to be applied belongs; and
  generating the application interface rule, where the application interface rule includes the interface group identifier.

In some embodiments of the present disclosure, the processor 703 is further configured to perform the following operations: before determining the interface group to which an interface identifier corresponding to the at least one forwarding device interface to which the FlowSpec rule needs to be applied belongs, creating the interface group identifier and an interface identifier of a forwarding device interface included in the interface group; and
  sending the interface group identifier and the interface identifier of the forwarding device interface included in the interface group that are created to the forwarding device.

In some embodiments of the present disclosure, the processor 703 is configured to perform the following operation:
  generating the application interface rule, where the application interface rule includes a service filter criterion, and the service filter criterion is used to obtain through filtering, from the forwarding device interface information, the at least one forwarding device interface to which the FlowSpec rule needs to be applied.

In some embodiments of the present disclosure, the processor 703 is configured to perform the following operation:

sending the FlowSpec message to the forwarding device by using BGP route attribute information, where the BGP route attribute information carries the application interface rule.

In some embodiments of the present disclosure, the processor 703 is configured to perform the following operation:

receiving, by using the Border Gateway Protocol-Link State (BGP-LS) protocol, the forwarding device interface information reported by the forwarding device.

Figure 8:
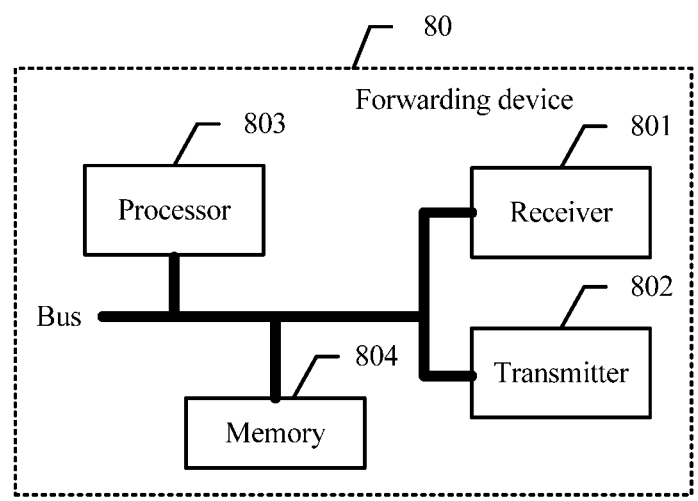
FIG. 8 is a schematic structural composition diagram of another forwarding device according to an embodiment of the present disclosure.

The following describes another forwarding device provided in an embodiment of the present disclosure. Referring to FIG. 8, the forwarding device 800 includes:

a receiver 801, a transmitter 802, a processor 803, and a memory 804 (there may be one or more processors 803 on the forwarding device 800, and one processor is used as an example in FIG. 8). In some embodiments of the present disclosure, the receiver 801, the transmitter 802, the processor 803, and the memory 804 may be connected by using a bus or in another manner. In FIG. 8, a bus connection is used as an example.

The memory 804 may include a read-only memory and a random access memory, and provide an instruction and data to the processor 803. A part of the memory 804 may further include an NVRAM. The memory 804 stores an operating system and an operation instruction, an executable module or a data structure, a subset thereof, or an extended set thereof. The operation instruction may include various operation instructions, used to implement various operations. The operating system may include various system programs, used to implement various basic services and process hardware-based tasks.

The processor 803 controls an operation of the forwarding device. The processor 803 may also be referred to as a CPU. In a specific application, all components of the forwarding device are coupled together by using a bus system. In addition to a data bus, the bus system may include a power bus, a control bus, a signal status bus, and the like. However, for clear description, various types of buses in the figure are referred to as the bus system.

The method disclosed in this embodiment of the present disclosure is applicable to the processor 803, or implemented by using the processor 803. The processor 803 may be an integrated circuit chip and has a signal processing capability. In an implementation process, operations in the foregoing methods can be implemented by using a hardware integrated logical circuit in the processor 803 or by using instructions in a form of software. The processor 803 may be a general purpose processor, a DSP, an ASIC, an FPGA or another programmable logic device, a discrete gate or transistor logic device, or a discrete hardware component. The processor 803 may implement or perform the methods, the operations, and logical block diagrams that are disclosed in the embodiments of the present disclosure. The general purpose processor may be a microprocessor, or the processor may be any conventional processor or the like. Operations of the methods disclosed with reference to the embodiments of the present disclosure may be directly executed and accomplished by using a hardware decoding processor, or may be executed and accomplished by using a combination of hardware and software modules in the decoding processor. A software module may be located in a mature storage medium in the art, such as a random access memory, a flash memory, a read-only memory, a programmable read-only memory, an electrically erasable programmable memory, a register, or the like. The storage medium is located in the memory 804, and the processor 803 reads information from the memory 804 and completes the operations in the foregoing methods in combination with hardware of the processor.

In this embodiment of the present disclosure, the processor 803 is configured to perform the following operations:

reporting forwarding device interface information of the forwarding device to a controller;

receiving a FlowSpec message sent by the controller, and obtaining, from the FlowSpec message, an application interface rule and a FlowSpec rule;

determining, according to the application interface rule, whether a forwarding device interface of the forwarding device includes at least one forwarding device interface to which the FlowSpec rule needs to be applied; and when the forwarding device interface of the forwarding device includes the at least one forwarding device interface to which the FlowSpec rule needs to be applied, applying the FlowSpec rule to the at least one forwarding device interface to which the FlowSpec rule needs to be applied.

In some embodiments of the present disclosure, when the application interface rule is an interface identifier set, the processor 803 is configured to perform the following operations:

obtaining an interface identifier from the interface identifier set; and searching an interface identifier corresponding to the forwarding device interface of the forwarding device for the interface identifier in the interface identifier set.

In some embodiments of the present disclosure, when the application interface rule is an interface group identifier, the processor 803 is configured to perform the following operations:

obtaining an interface group based on the interface group identifier; and searching the forwarding device interface of the forwarding device for a forwarding device interface included in the interface group.

In some embodiments of the present disclosure, the processor 803 is configured to perform the following operations: before the determining, according to the application interface rule, whether a forwarding device interface of the forwarding device includes at least one forwarding device interface to which the FlowSpec rule needs to be applied, receiving an interface group identifier and an interface identifier of the forwarding device interface included in the interface group that are delivered by the controller; and selecting the forwarding device interface of the forwarding device based on the interface group identifier and the interface identifier of the forwarding device interface included in the interface group that are delivered by the controller, and maintaining an association relationship between the forwarding device interface of the forwarding device and the interface group.

In some embodiments of the present disclosure, when the application interface rule is a service filter criterion, the processor 803 is configured to perform the following operations:

searching the forwarding device interface of the forwarding device for a forwarding device interface meeting the service filter criterion; and if the forwarding device interface of the forwarding device includes the forwarding device interface meeting the service filter criterion, determining that the forwarding device includes the at least one forwarding device interface to which the FlowSpec rule needs to be applied, or if the forwarding device interface of the forwarding device does not include a forwarding device interface meeting the service filter criterion, determining that the forwarding device interface of the forwarding device does not include the at least one forwarding device interface to which the FlowSpec rule needs to be applied.

In some embodiments of the present disclosure, the forwarding device interface information stored in the memory 804 includes at least one of the following information: interface identifier interface identifier information, interface description interface description information, interface service interface service information, and interface group interface group information.

In some embodiments of the present disclosure, the processor 803 is configured to perform the following operation: reporting the forwarding device interface information of the forwarding device to the controller by using the Border Gateway Protocol-Link State (BGP-LS).

Figure 9:
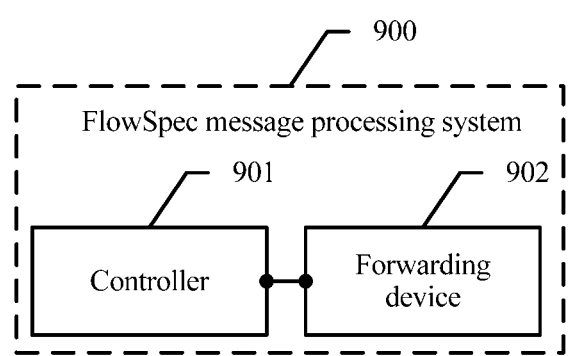
FIG. 9 is a schematic structural composition diagram of a FlowSpec message processing system according to an embodiment of the present disclosure.

The foregoing embodiments separately describe the controller and the forwarding device provided in the embodiments of the present disclosure. In the following, a FlowSpec message processing system 900 shown in FIG. 9 includes a controller 901 as described in the embodiment and a forwarding device 902 as described in the embodiment.

In addition, it should be noted that the described apparatus embodiment is merely an example. The units described as separate parts may or may not be physically separate, and parts displayed as units may or may not be physical units, may be located in one position, or may be distributed on a plurality of network units. Some or all the modules may be selected according to actual needs to achieve the objectives of the solutions of the embodiments. In addition, in the accompanying drawings of the apparatus embodiments provided in the present disclosure, connection relationships between modules indicate that the modules have communication connections with each other, which may be implemented as one or more communications buses or signal cables. Persons of ordinary skill in the art may understand and implement the embodiments of the present disclosure without creative efforts.

Based on the description of the foregoing implementations, persons skilled in the art understands that the present disclosure may be implemented by software in addition to necessary universal hardware, or by dedicated hardware, including a dedicated integrated circuit, a dedicated CPU, a dedicated memory, a dedicated component, and the like. Generally, any functions that can be performed by a computer program can be easily implemented by using corresponding hardware. Moreover, a specific hardware structure used to achieve a same function may be of various forms, such as in a form of an analog circuit, a digital circuit, a dedicated circuit. However, as for the present disclosure, software program implementation is a better implementation in most cases. Based on such an understanding, the technical solutions of the present disclosure essentially or the part contributing to the prior art may be implemented in a form of a software product. The computer software product is stored in a readable storage medium, such as a floppy disk, a USB flash drive, a removable hard disk, a read-only memory (ROM), a random access memory (RAM), a magnetic disk, or an optical disc of a computer, and includes several instructions for instructing a computer device (which may be a personal computer, a server, a network device, or the like) to perform the methods described in the embodiments of the present disclosure.

In conclusion, the foregoing embodiments are merely intended to describe the technical solutions of the present disclosure, but not to limit the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present disclosure.

The invention claimed is:

1. A flow specification (FlowSpec) message processing method, comprising:
   receiving, by a controller, forwarding device interface information reported by a forwarding device;
   generating, by the controller, a FlowSpec message which instructs the forwarding device to apply an FlowSpec rule to at least one forwarding device interface of the forwarding device; and
   sending, by the controller, the FlowSpec message to the forwarding device.

2. The method according to claim 1, further comprising:
   generating, by the controller, an application interface rule according to the forwarding device interface information.

3. The method according to claim 2, wherein the FlowSpec message comprises the FlowSpec rule and an application interface rule which instructs the forwarding device to apply the FlowSpec rule to the at least one forwarding device interface.

4. The method according to claim 3, wherein the sending the FlowSpec message to the forwarding device comprises:
   sending, by the controller, the FlowSpec message to the forwarding device by using BGP route attribute information, wherein the BGP route attribute information carries the application interface rule.

5. The method according to claim 2, wherein the generating according to the forwarding device interface information comprises:
   obtaining, by the controller, at least one interface identifier corresponding to the at least one forwarding device interface to which the FlowSpec rule needs to be applied, wherein the forwarding device interface information comprises an interface identifier of the forwarding device interface; and
   generating, by the controller, the application interface rule, wherein the application interface rule comprises an interface identifier set, and the interface identifier set comprises the at least one interface identifier corresponding to the at least one forwarding device interface to which the FlowSpec rule needs to be applied.

6. The method according to claim 2, wherein the generating according to the forwarding device interface information comprises:
   determining, by the controller, an interface group to which the at least one forwarding device interface belongs;
   obtaining, by the controller, an interface group identifier corresponding to the interface group; and
   generating, by the controller, the application interface rule, wherein the application interface rule comprises the interface group identifier.

7. The method according to claim 6, further comprising:
   before determining the interface group, obtaining, by the controller, the interface group identifier and an interface identifier of a forwarding device interface comprised in the interface group; and sending, by the controller, the interface group identifier and the interface identifier of the forwarding device interface comprised in the interface group to the forwarding device.

8. The method according to claim 2, wherein the generating according to the forwarding device interface information comprises:
generating, by the controller, the application interface rule, wherein the application interface rule comprises a service filter criterion, and the service filter criterion is used to obtain through filtering, the at least one forwarding device interface.

9. The method according to claim 2, wherein the receiving forwarding device interface information reported by a forwarding device comprises:
receiving, by the controller by using a Border Gateway Protocol-Link State (BGP-LS) protocol, the forwarding device interface information reported by the forwarding device.

10. A flow specification (FlowSpec) message processing method, comprising:
reporting, by a forwarding device, forwarding device interface information of the forwarding device to a controller;
receiving, by the forwarding device, a FlowSpec message sent by the controller, wherein the FlowSpec message instructs the forwarding device to apply an FlowSpec rule to at least one forwarding device interface of the forwarding device; and
applying, by the forwarding device, the FlowSpec rule to the at least one forwarding device interface.

11. The method according to claim 10, further comprising:
obtaining, by the forwarding device, an application interface rule and the FlowSpec rule according to the FlowSpec message, wherein the application interface rule instructs the forwarding device to apply an FlowSpec rule to the at least one forwarding device interface; and
determining, by the forwarding device according to the application interface rule, whether the forwarding device comprises the at least one forwarding device interface.

12. The method according to claim 11, wherein the determining, by the forwarding device according to the application interface rule, whether the forwarding device comprises at least one forwarding device interface comprises:
when the application interface rule comprises an interface identifier set, obtaining, by the forwarding device, an interface identifier from the interface identifier set; and
searching, by the forwarding device, an interface identifier corresponding to the forwarding device interface of the forwarding device matches the interface identifier from the interface identifier set.

13. The method according to claim 11, wherein the determining, by the forwarding device according to the application interface rule, whether a forwarding device interface of the forwarding device comprises at least one forwarding device interface comprises:
when the application interface rule comprises an interface group identifier, obtaining, by the forwarding device, an interface group based on the interface group identifier; and
searching, by the forwarding device, the forwarding device interface of the forwarding device for a forwarding device interface comprised in the interface group.

14. The method according to claim 13, further comprising:
before the determining, by the forwarding device according to the application interface rule, whether a forwarding device interface of the forwarding device comprises at least one forwarding device interface, receiving, by the forwarding device, an interface group identifier and an interface identifier of the forwarding device interface comprised in the interface group that are delivered by the controller; and
filtering, by the forwarding device, the forwarding device interface of the forwarding device according to the interface group identifier and the interface identifier of the forwarding device interface comprised in the interface group, and maintaining an association relationship between the forwarding device interface of the forwarding device and the interface group.

15. The method according to claim 11, wherein the determining, by the forwarding device according to the application interface rule, whether a forwarding device interface of the forwarding device comprises at least one forwarding device interface comprises:
when the application interface rule comprises a service filter criterion, searching, by the forwarding device, the forwarding device interface of the forwarding device for a forwarding device interface meeting the service filter criterion; and
if the forwarding device interface of the forwarding device comprises the forwarding device interface meeting the service filter criterion, determining that the forwarding device interface of the forwarding device comprises the at least one forwarding device interface to which the FlowSpec rule needs to be applied, or if the forwarding device interface of the forwarding device does not comprise a forwarding device interface meeting the service filter criterion, determining that the forwarding device interface of the forwarding device does not comprise the at least one forwarding device interface to which the FlowSpec rule needs to be applied.

16. The method according to claim 10, wherein the forwarding device interface information comprises at least one of following information: interface identifier information, interface description information, interface service information, or interface group information.

17. The method according to claim 10, wherein the reporting, by a forwarding device, forwarding device interface information of the forwarding device to a controller comprises:
reporting, by the forwarding device, the forwarding device interface information of the forwarding device to the controller by using a Border Gateway Protocol-Link State (BGP-LS).

18. A controller, comprising:
one or more memories storing instructions, and
one or more processors, wherein the instructions are executed by the one or more processors to cause the controller to:
receive forwarding device interface information reported by a forwarding device;
generate a flow specification (FlowSpec) message which instructs the forwarding device to apply an FlowSpec rule to at least one forwarding device interface of the forwarding device; and
send the FlowSpec message to the forwarding device.

19. The controller according to claim 18, wherein the instructions are executed by the one or more processors to further cause the controller to:

generate an application interface rule according to the forwarding device interface information.

20. The controller according to claim 19, wherein the FlowSpec message comprises the FlowSpec rule and an application interface rule which instructs the forwarding device to apply the FlowSpec rule to the at least one forwarding device interface.

21. A forwarding device, comprising:
one or more memories storing instructions, and
one or more processors, wherein the instructions are executed by the one or more processors to cause the forwarding device to:
report forwarding device interface information of the forwarding device to a controller;
receive a flow specification (FlowSpec) message sent by the controller, wherein the FlowSpec message instructs the forwarding device to apply an FlowSpec rule to at least one forwarding device interface of the forwarding device; and
apply the FlowSpec rule to the at least one forwarding device interface.

22. The forwarding device according to claim 21, wherein the instructions are executed by the one or more processors to further cause the controller to:
obtain an application interface rule and the FlowSpec rule according to the FlowSpec message, wherein the application interface rule instructs the forwarding device to apply an FlowSpec rule to the at least one forwarding device interface; and
determine, according to the application interface rule, whether the forwarding device comprises the at least one forwarding device interface.

* * * * *